(12) United States Patent
Obayashi et al.

(10) Patent No.: US 7,033,083 B2
(45) Date of Patent: Apr. 25, 2006

(54) SUPPORT STRUCTURE CARRYING THRUST LOAD OF TRANSMISSION, METHOD OF MANUFACTURING THEREOF AND THRUST NEEDLE ROLLER BEARING

(75) Inventors: Kousuke Obayashi, Iwata (JP); Tetsuya Hayashi, Iwata (JP); Shinji Oishi, Iwata (JP)

(73) Assignee: NTN Corporation, Osaka (JP)

( * ) Notice: Subject to any disclaimer, the term of this patent is extended or adjusted under 35 U.S.C. 154(b) by 163 days.

(21) Appl. No.: 10/700,498

(22) Filed: Nov. 5, 2003

(65) Prior Publication Data

US 2004/0091193 A1 May 13, 2004

(30) Foreign Application Priority Data

Nov. 7, 2002 (JP) .............................. 2002-323874
Jan. 9, 2003 (JP) .............................. 2003-003116

(51) Int. Cl.
*F16C 33/48* (2006.01)
(52) U.S. Cl. ....................... 384/623; 384/619
(58) Field of Classification Search ......... 384/618–623
See application file for complete search history.

(56) References Cited

U.S. PATENT DOCUMENTS

| | | | |
|---|---|---|---|
| 811,136 A * | 1/1906 | Jahn | 384/618 |
| 1,380,622 A | 6/1921 | Winn | |
| 1,894,595 A * | 1/1933 | Mitchel | 384/577 |
| 2,854,300 A | 9/1958 | Winchell | |
| 2,978,282 A | 4/1961 | Fisher | |
| 3,240,542 A * | 3/1966 | Rudolf | 384/623 |
| 4,380,444 A | 4/1983 | Dolza | |
| 5,607,371 A | 3/1997 | Yamaguchi | |
| 5,848,846 A | 12/1998 | Sugiyama et al. | |

FOREIGN PATENT DOCUMENTS

| | | |
|---|---|---|
| DE | 31 34 625 A1 | 4/1983 |
| DE | 40 40 414 A1 | 7/1992 |
| DE | 197 11 389 A1 | 9/1998 |
| FR | 1 223 324 A | 6/1960 |
| GB | 444292 | 3/1936 |
| GB | 509004 | 7/1939 |
| JP | 10-259821 | 9/1998 |
| JP | 11-193856 | 7/1999 |
| JP | P2002-70872 A | 3/2002 |

* cited by examiner

*Primary Examiner*—Thomas R. Hannon
(74) *Attorney, Agent, or Firm*—McDermott Will & Emery LLP

(57) ABSTRACT

A support structure carries a thrust load of a transmission which includes a torque converter having an impeller and a turbine opposite to each other with a stator therebetween. A thrust needle roller bearing having needle rollers arranged in two rows is provided at, at least one of places respectively between the stator and the impeller and between the stator and the turbine. The support structure carrying a thrust load of the transmission, a method of manufacturing the support structure and the thrust needle roller bearing are thus obtained, with an improvement in inflow and outflow of a lubricating oil, a reduction of the differential slip of the needle rollers, and an improvement in strength durability.

9 Claims, 16 Drawing Sheets

2a,2b 2a,2b

TYPE 1

TYPE 2

TYPE 3

TYPE 4

TYPE 5

SUPPORT STRUCTURE CARRYING THRUST LOAD OF TRANSMISSION, METHOD OF MANUFACTURING THEREOF AND THRUST NEEDLE ROLLER BEARING

BACKGROUND OF THE INVENTION

1. Field of the Invention

The present invention relates to a support structure carrying a thrust load of a transmission, a method of manufacturing the support structure and a thrust needle roller bearing.

2. Description of the Background Art

A thrust needle roller bearing is constituted of needle rollers, a cage and a race, and is structured to allow the needle rollers to be in line contact with the race. Therefore, despite of a small bearing area, this type of bearing is advantageous because of its high load capacity and high stiffness. The thrust needle roller bearing is thus suitable for use under hostile conditions, for example, during a drive under conditions like scarce lubrication and high-velocity rotation, and is accordingly used as a support structure carrying a thrust load of an automatic transmission of an automobile (e.g. support structure for a continuously variable transmission).

A conventional thrust needle roller bearing is known from Japanese Patent Laying-Open No. 2002-70872 according to which at least one of the inflow and the outflow of a lubricating oil is improved or promoted so as to increase the amount of the lubricating oil which passes through the bearing per unit time. This thrust needle roller bearing is described below in connection with FIGS. 17A–17C.

As shown in FIGS. 17A–17C, this thrust needle roller bearing 50 has a plurality of needle rollers 80 and two annular cages 60 and 70. These two cages 60 and 70 respectively have a plurality of windows 61 and 71 having a length in the radial direction longer than that of the rollers. Roller holder portions 64 and 74 formed at these windows 61 and 71 hold needle rollers 80 therebetween from above and below. The radial length la of roller holder portions 64 and 74 of two cages 60 and 70 is made smaller than the length l of the rollers. At least one of two cages 60 and 70 is bent so that at least one of the thicknesses t1 and t2 is smaller than the thickness t0 in the direction perpendicular to the radial direction as seen in FIG. 13B (hereinafter referred to as perpendicular direction). Here, thicknesses t1 and t2 refer to respective thicknesses of portions of cages 60 and 70 that are located respectively outside and inside in the radial direction with respect to roller holder portions 64 and 74, and the thickness t0 refers to the thickness of roller holder portions 64 and 74 in the perpendicular direction.

Outer plate-like portions 62 and 72 of two cages 60 and 70 are laid on each other in the perpendicular direction while the innermost parts 67 and 77 respectively of inner plate-like portions 63 and 73 are bent in the perpendicular direction to be laid on each other. The innermost part 67 of inner plate-like portion 63 is caulked and thereby fixed.

In this way, on at least one of radially outer portions 62 and 72 and radially inner portions 63 and 73 that are smaller in thickness than roller holder portions 64 and 74, the inflow or outflow of the lubricating oil can be improved or promoted to increase the amount of the lubricating oil passing through the bearing per unit time. Moreover, since the passage of the lubricating oil is less prone to be blocked by cages 60 and 70, the lubricating oil does not stay in the bearing. Thus, any increase of the oil temperature can be avoided and the durability of the bearing can be improved.

It has been done in some cases that car manufactures and automatic-transmission manufactures use an oil to which an additive is added for energy saving. The additive-containing oil is inferior to normal oils in lubricating ability for bearings. When such an oil is used for a conventional single-row thrust roller bearing as shown in FIGS. 17A–17C, the following problems occur.

The conventional thrust needle roller bearing 50 shown in FIGS. 17A–17C is structured to allow needle rollers 80 to be in line contact with the race and thus the raceway surface is in rolling line contact with needle rollers 80. Accordingly, the circumferential velocity is higher at a radially outer part of the raceway surface relative to the circumferential velocity at the center of rotation of the bearing. Thrust needle rollers in a single row are usually used in a portion carrying a thrust load of such a transmission as CVT (Continuously variable transmission). Then, there is a difference in circumferential velocity between the raceway surface and the roller. A maximum difference in circumferential velocity arises, between the difference in circumferential velocity between the raceway surface and the roller at the inner end of the roller and the difference in circumferential velocity therebetween at the outer end of the roller. This difference is greater as the roller is longer with respect to the outer diameter of the roller, resulting in a greater differential slip (skew of the roller). The occurrence of the differential slip causes breakage of an oil film and consequently metal-to-metal contact. Then, the metal-to-metal contact portion generates heat and thereby surface damage (smearing) as well as surface-originated peeling are likely to occur, particularly when the rotational speed is higher. In addition, it is often seen that the lifetime becomes shorter due to the above factors.

Some thrust needle roller bearings are structured so that the cage and the race are in sliding contact with each other. In such a case, the cage blocks flow of a lubricating oil to resist the flow thereof to an area where needle rollers and the race are in rolling contact with each other. In particular, it is necessary that the oil flows to the rolling surface of the needle rollers. If the amount of the oil is scarce, metal-to-metal contact between the needle rollers and the race occurs, possibly resulting in surface damage at an earlier stage.

Box-shaped cages 60 and 70 of the conventional thrust needle roller bearing 50 block flow of the lubricant to needle rollers 80 and thus the surface damage at an earlier stage mentioned above is likely to occur. Further, although two cages 60 and 70 are attached to each other and the periphery thereof is caulked, this manner of caulking could cause two cages 60 and 70 to separate from each other.

SUMMARY OF THE INVENTION

The present invention has been made in view of the above-discussed circumstances and an object of the present invention is to provide a support structure which carries a thrust load of a transmission, a method of manufacturing thereof and a thrust needle roller bearing, with an improvement of the inflow and outflow of a lubricating oil, a reduction of the differential slip of needle rollers, and an improvement of the strength durability.

According to the present invention, a support structure carrying a thrust load of a transmission is a support structure carrying a thrust load of a transmission which has an input shaft with its rotation changed stepwise or continuously to be transmitted to an output shaft. A thrust needle roller bearing carries a thrust load generated by rotation of the input shaft or the output shaft and the thrust needle roller bearing has needle rollers arranged in two rows.

Regarding the support structure which carries a thrust load of the transmission, the thrust needle roller bearing has needle rollers arranged in two rows, so that the length in the radial direction of one needle roller can be shortened as compared with that of a single-row needle roller. Accordingly, the differential slip of the needle rollers can be reduced and thus breakage of an oil film and metal-to-metal contact can be avoided. Then, a reduction of the heat generation of the support structure as well as high-speed rotation are achieved. Consequently, any surface damage and surface-originated peeling can be prevented to improve the durability of the bearing. Moreover, as the differential slip can be reduced, the support structure has a low torque and thereby a high energy efficiency can be achieved. In this way, the support structure carrying a thrust load of the transmission can be obtained with an improved strength durability.

Preferably, regarding the support structure which carries a thrust load of the transmission, the transmission includes a torque converter having an impeller and a turbine opposite to each other with a stator therebetween, and the thrust needle roller bearing having the needle rollers arranged in two rows is provided at, at least one of places respectively between the stator and the impeller and between the stator and the turbine.

Preferably, regarding the support structure which carries a thrust load of the transmission, the transmission includes a gear mechanism constituted of a plurality of gears, and the thrust needle roller bearing having the needle rollers arranged in two rows is provided to carry a thrust load generated by rotation of the gears.

Preferably, regarding the support structure which carries a thrust load of the transmission, the support structure carrying a thrust load of the transmission is a support structure for a continuously variable transmission having an input shaft with its rotation changed continuously to be transmitted to an output shaft.

Preferably, regarding the support structure which carries a thrust load of the transmission, the width of a groove of a first pulley provided on the input shaft and the width of a groove of a second pulley provided on the output shaft are each changed to vary the diameter of contact of a belt, looped over the first pulley and the second pulley, with the first pulley as well as the diameter of contact of the belt with the second pulley and thereby continuously change rotation of the input shaft to transmit resultant rotation to output shaft.

Thus, in the continuously variable transmission having the belt looped over the pulleys, the differential slip can be reduced. The support structure has a low torque and thereby a high energy efficiency as well as an improved strength durability can be achieved.

Preferably, regarding the support structure which carries a thrust load of the transmission, the thrust needle roller bearing has a plurality of needle rollers and two annular cages. The two cages respectively have a plurality of pockets having a radial length slightly larger than that of the needle rollers. Roller holder portions that are formed at the pockets respectively are structured to allow the two cages to hold the needle rollers therebetween in the direction from above and below and thereby carry a thrust load of the transmission, and needle rollers are arranged in two rows in each of the pockets.

In this way, the transmission having the double-row thrust needle roller bearing can be implemented with a simple structure.

Preferably, the needle rollers of the support structure carrying a thrust load of the transmission each have an end-surface shape represented by symbol A, symbol F or a combination of those represented by symbols A and F defined by JIS.

Thus, the shape of the end surface of the needle roller can appropriately be selected.

Preferably, regarding the above-described support structure carrying a thrust load of the transmission, one of the double-row needle rollers that is located on the radially outer side has its length which is at least the length of the needle roller located on the radially inner side.

The radially outer needle roller thus has its length larger than that of the radially inner needle roller so that the load capacity on the radially outer side can appropriately be increased to a desired load capacity.

Preferably, regarding the support structure carrying a thrust load of the transmission, the roller holder portion has its corner smoothly rounded.

Thus, the needle rollers can stably be guided and held without breakage of a lubricating-oil film formed on the surface of the needle rollers.

Preferably, regarding the support structure carrying a thrust load of the transmission, one of the two cages is caulked to be fixed to the other cage on at least one of the radially outermost end and the radially innermost end of the two cages.

In this way, the two cages can surely be fixed by the caulking so that separation of needle rollers from the cages, due to separation of the two cages, can be prevented. Here, the portion to be caulked may appropriately be selected from one of the radially outer side and radially inner side of the cages and both of the radially outer and inner sides.

Preferably, regarding the support structure carrying a thrust load of the transmission, the two cages are caulked on both of the radially outermost end and the radially innermost end of the two cages, and a flat portion having a cross-sectional height lower than that of the roller holder portions is provided between a caulked portion produced by the caulking and respective ends of the needle rollers.

In this way, the radially inner part and the radially outer part of the two cages are caulked, the flat portion having the cross-sectional height lower than that of the roller holder portions is provided between the caulked portion and respective ends of the needle rollers, and accordingly not only the outflow of the lubricating oil but the inflow of the lubricating oil can be improved. Then, seizure of any part of the bearing can surely be prevented and drilling wear of an end surface of a needle roller and a pocket of the cage can be reduced. Further, as it hardly occurs that the cages block passage of the lubricating oil, the lubricating oil is unlikely to stay so that any increase of the oil temperature can be reduced. Accordingly, together with an increase in strength of the cages that is achieved by fixing both of the radially outermost end and the radially innermost end of the two cages, a further improvement of the durability of the bearing can be achieved.

Preferably, regarding the support structure carrying a thrust load of the transmission, one of the two cages is bent into C-shape to be caulked to the other cage on at least one of the radially outermost end and the radially innermost end of the two cages.

This caulking can be done to prevent the two cages from separating from each other.

Preferably, regarding the support structure carrying a thrust load of the transmission, the two cages are welded on at least one of the radially outermost end and the radially innermost end of the two cages.

This welding can be done to surely fix the two cages and further prevent deformation of the cages in assembly.

Preferably, regarding the support structure carrying a thrust load of the transmission, the two cages are laid on each other to be in contact with each other at a portion where they contact an end surface of the needle roller.

Thus, drilling wear of the pockets of the cages due to the end surfaces of the needle rollers can be reduced.

Preferably, regarding the support structure carrying a thrust load of the transmission, the two cages are caulked to be fixed on both of the radially outermost end and the radially innermost end of the cages, one of the two cages is bent for caulking on the outermost end and the other of the two cages is bent for caulking on the innermost end.

Preferably, regarding the support structure carrying a thrust load of the transmission, the two cages are caulked to be fixed on both of the radially outermost end and the radially innermost end of the cages, and one of the two cages is bent for caulking on both of the outermost end and the innermost end.

The bent portions for caulking may be bent in the same direction or in different directions on both of the outermost end and the innermost end.

Preferably, regarding the support structure carrying a thrust load of the transmission, the two cages are caulked along the entire circumferential periphery of the cages.

In this way, the two cages can firmly be integrated into one unit.

Preferably, regarding the support structure carrying a thrust load of the transmission, the two cages are partially caulked at a plurality of portions in the circumferential direction.

Thus, as compared with the caulking of the two cages along the entire periphery, the caulking process can be simplified and deformation of the cages in the caulking process can be reduced. Preferably, the caulked portions on the radially outermost end and the radially innermost end of the two cages may be placed at regular intervals in the circumferential direction with a phase difference between the caulked portions, so that the deformation of the cages can further be reduced.

Preferably, regarding the support structure carrying a thrust load of the transmission, the two cages each have an alignment part for positioning one of the two cages with respect to the other cage and for preventing displacement of the other cage from the one cage.

The positioning of the two cages in assembly can thus be facilitated and displacement of one of the two cages from the other thereof after assembly can be prevented.

The thrust needle roller bearing of the present invention is used for a support structure carrying a thrust load of the above-described transmission.

According to one method of manufacturing a support structure carrying a thrust load of a transmission in accordance with the present invention, two cages and needle rollers are assembled so that the cages hold needle rollers therebetween in the direction from above and below by roller holder portions formed respectively at a plurality of pockets, one of the two cages is caulked to the other cage, and thereafter the two cages and the needle rollers are carburized, quenched and tempered. The needle rollers may be quenched and tempered in advance.

The above-described method does not require annealing of the caulked portion so that the cages having a high strength (high hardness) and a large depth of a hardened layer can be produced at a low cost.

According to another method of manufacturing a support structure carrying a thrust load of a transmission in accordance with the present invention, two cages and needle rollers are each quenched and tempered, thereafter they are assembled so that the cages hold the needle rollers therebetween in the direction from above and below by roller holder portions formed respectively at a plurality of pockets, and one of the two cages is caulked to the other cage.

According to the above-described method, different heat treatments can be performed respectively on the two cages and needle rollers. For example, each of the two cages can be carburized, quenched, tempered, and soft-nitrided.

Preferably, according to the one and another methods of manufacturing the support structure carrying a thrust load of the transmission, the two cages are each produced by shaving or press working.

Thus the two cages each can appropriately be formed by shaving or press working.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Embodiments of the present invention are hereinafter described in detail in connection with the drawings.

First Embodiment

Figure 1:
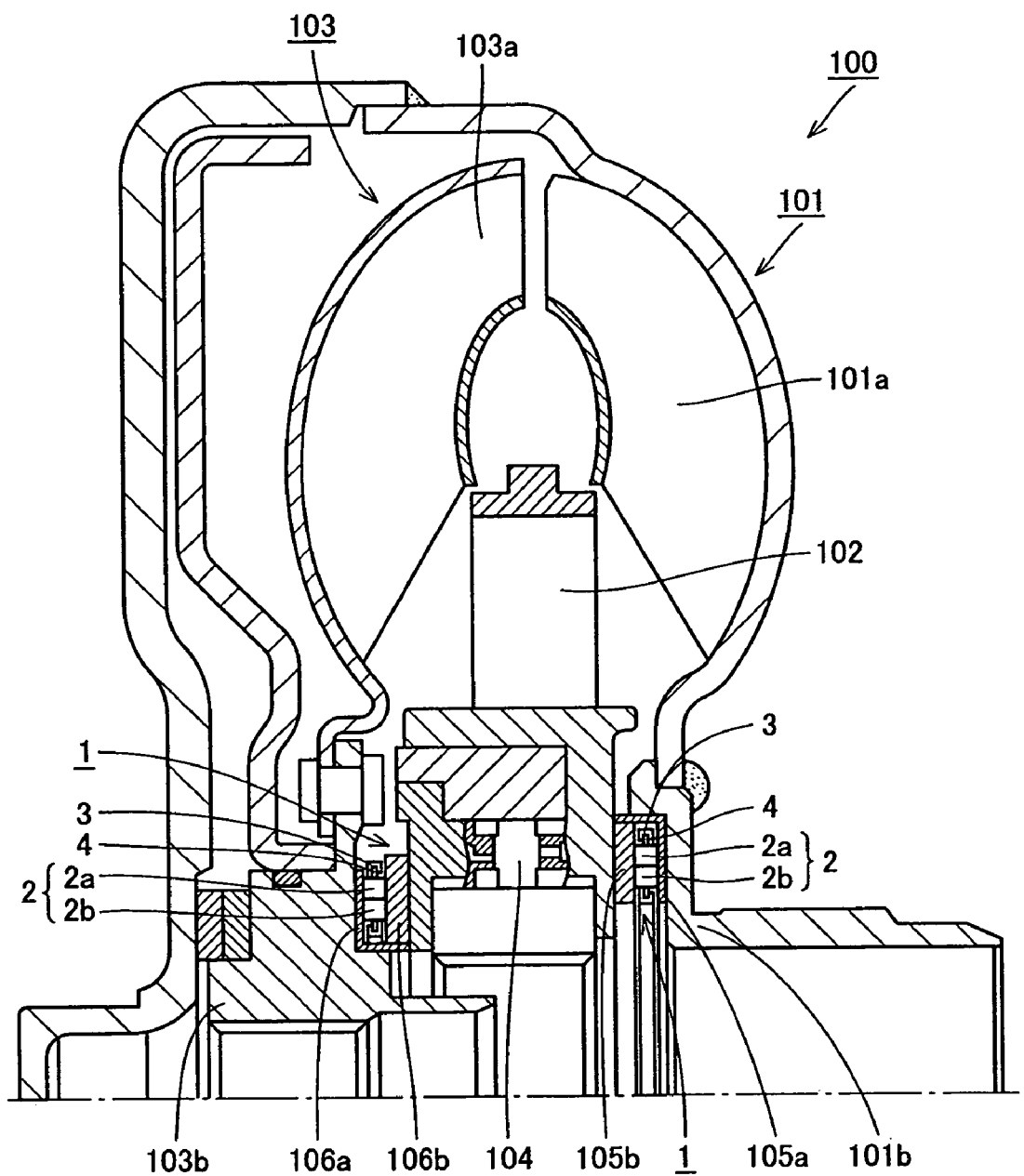
FIG. 1 is a schematic cross-sectional view showing a support structure which carries a thrust load of a transmission according to a first embodiment of the present invention.

Referring to FIG. 1, a transmission, for example, an automatic transmission is shown. The automatic transmission is usually constituted of a torque converter 100 and a planetary gear mechanism (not shown).

Torque converter 100 chiefly includes an impeller 101, a stator 102 and a turbine 103. According to this embodiment, a support structure carrying a thrust load of the transmission corresponds to thrust needle roller bearings 1 attached, for example, between impeller 101 and stator 102 and between stator 102 and turbine 103.

In this torque converter 100, impeller 101 coupled to an output shaft of an engine and turbine 103 coupled to an input shaft of the transmission are arranged opposite to each other. Stator 102 is attached, via a one-way clutch 104, to a stator shaft fixed to a casing. This stator 102 serves to redirect a fluid circulating between impeller blades 101a and turbine blades 103a that are cup-shaped, when the fluid returns from turbine 103 to impeller 101 in the radially central portion, so as to apply a forward-direction rotational force and thereby amplify a transmission torque.

Thrust needle roller bearing 1 between impeller 101 and stator 102 has needle rollers 2, two cages 3 and 4 and races 105a and 105b. Race 105a is attached to an impeller hub 101b and race 105b is attached to stator 102.

Thrust needle roller bearing 1 between stator 102 and turbine 103 has needle rollers 2, two cages 3 and 4 and races 106a and 106b. Race 106a is attached to a turbine hub 103b and race 106b is attached to stator 102.

Thrust needle roller bearings 1 attached between impeller 101 and stator 102 and between stator 102 and turbine 103 each have needle rollers 2 including needle rollers 2a and 2b arranged in two rows.

This thrust needle roller bearing 1 has its structure as specifically described below.

Referring to FIGS. 2A–2E and FIG. 3, thrust needle roller bearing 1 has a plurality of needle rollers 2 and two annular cages 3 and 4 that hold these needle rollers 2 at predetermined pitches in the circumferential direction. Two cages 3 and 4 respectively have a plurality of rectangular pockets 5 and 6 with the length in the radial direction larger than the length L of needle rollers 2, and are formed by pressing of a steel plate which is for example a cold-rolled steel plate (SPCC). Roller holder portions 5a and 6a are formed respectively on opposite sides of pockets 5 and 6 to extend toward and face each other. Needle rollers 2 are thus held by roller holder portions 5a and 6a therebetween in the direction from above and below. Instead of cages 3 and 4 as described above, any cages produced through draw-forming of a band steel by means of a press or through shaving may be used.

Needle rollers 2 include needle rollers 2a on the radially outer side and needle rollers 2b on the radially inner side, and are arranged in two rows in pockets 5 and 6. The double-row arrangement reduces a difference in circumferential velocity of revolution between the radially outer part and the radially inner part, and thereby the differential slip between the rollers and the raceway surface (not shown) is reduced. Then, less heat is generated from the contact portion and the surface damage (smearing) can be prevented.

Here, respective lengths L1 and L2 of double-row needle rollers 2a and 2b are equal to each other. These lengths, however, may be selected to satisfy a relation, L2 (length of the radially inner roller)≦L1 (length of the radially outer roller) or L1≦L2 depending on conditions in use. Preferably, the length of radially outer needle roller 2a is longer, for example, 1.2 times as long as the length of radially inner needle roller 2b so that the load capacity on the radially outer part is increased.

Figure 2A:
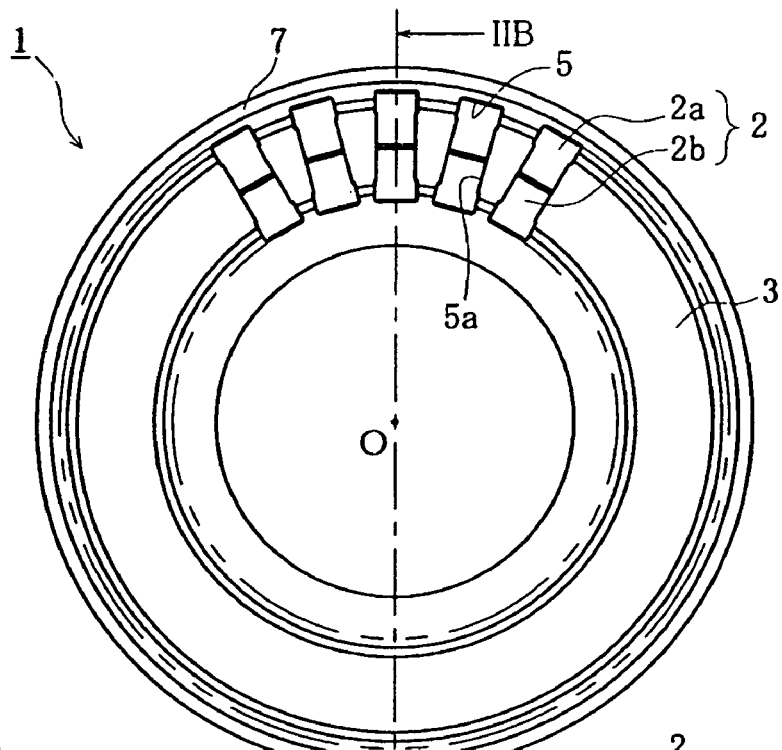
FIG. 2A is a plan view showing a thrust needle roller bearing which is a support structure carrying a thrust load of the transmission according to the first embodiment of the present invention.
Figure 2B:
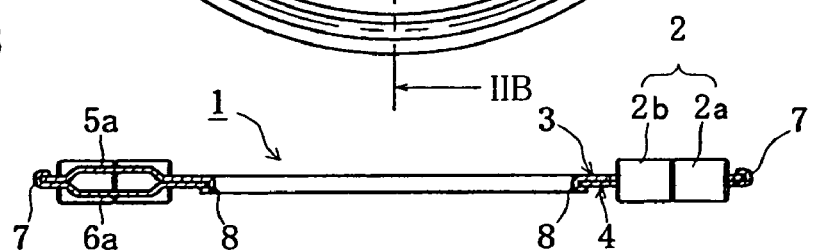
FIG. 2B is a cross-sectional view along line IIB—IIB in FIG. 2A.
Figure 2C:
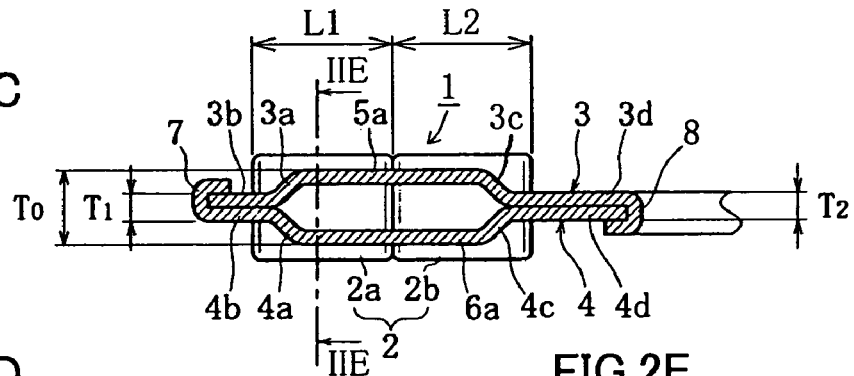
FIG. 2C is an enlarged view of an essential part shown in FIG. 2B.
Figure 2D:
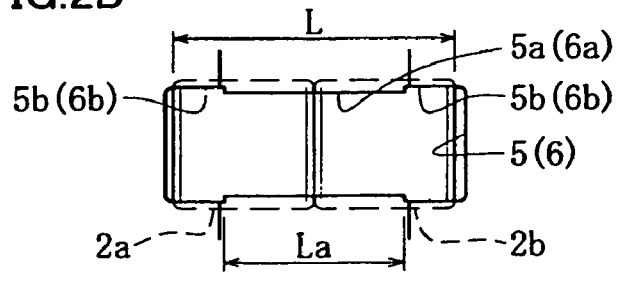
FIG. 2D is an enlarged view of an essential part shown in FIG. 2A.

As shown in FIG. 2D, the length La in the radial direction of roller holder portions 5a and 6a can be made smaller than the length L of needle rollers so that a lubricating oil can readily pass between needle rollers 2 and cages 3 and 4 through depressions 5b and 6b formed on both ends of roller holder portions 5a and 6a.

Figure 2E:
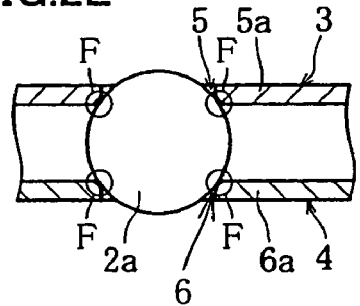
FIG. 2E is an enlarged cross-sectional view along line IIE—IIE in FIG. 2C.
Figure 3:
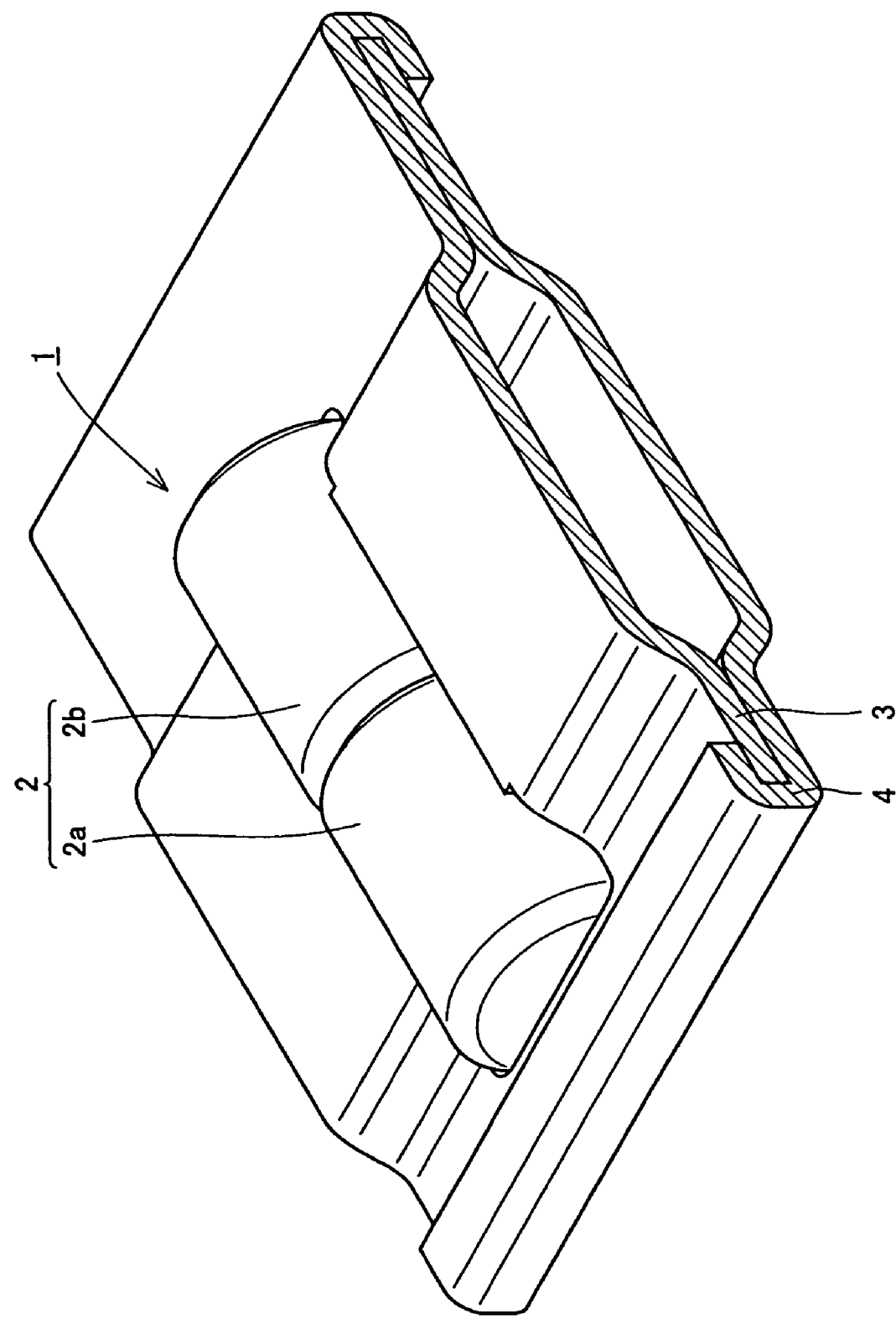
FIG. 3 is a partially cross-sectional perspective view showing, in an enlarged form, a part of the thrust needle roller bearing in FIGS. 2A–2E.

Further, as shown in FIG. 2E, respective corners (F) of roller holder portions 5a and 6a may be rounded when pockets 5 and 6 are punched by a press, or may be rounded to become smooth through surface-pressing of the inner rim after the punching. In this way, without breaking a lubricating-oil film formed on the surfaces of needle rollers 2a and 2b, needle rollers 2a and 2b can stably be guided and held. Here, the corners are "rounded" so that the sharp edges of the corners are removed to become round.

Of two cages 3 and 4, upper cage 3 has its roller holder portion 5a with its radially outer portion including a sloping extension 3a formed by bending the outer end of roller holder portion 5a and an outer plate-like portion 3b formed by bending the lower end of sloping extension 3a in the radial direction. Roller holder portion 5a of cage 3 also has its radially inner portion including a sloping extension 3c formed by bending the inner end of roller holder portion 5a and an inner plate-like portion 3d formed by bending the lower end of sloping extension 3c in the radial direction.

Lower cage 4 with the pockets punched with the same die as that for upper cage 3 has roller holder portion 6a with its radially outer portion including a sloping extension 4a formed by bending the outer end of roller holder portion 6a and an outer plate-like portion 4b formed by bending the outer end of sloping extension 4a. Roller holder portion 6a of lower cage 4 has its radially inner portion including a sloping extension 4c formed by bending the inner end of roller holder portion 6a and an inner plate-like portion 4d formed by bending the inner end of sloping extension 4c.

Respective outer plate-like portions 3b and 4b of two cages 3 and 4 are laid on each other so that these plates are in contact with each other in the direction perpendicular to the radial direction as seen in FIG. 2C (herein referred to as perpendicular direction). The outermost part of outer plate-like portion 4b is bent upward into C-shape so that outer plate-like portion 4b is caulked to outer plate-like portion 3b to form a caulked portion 7. Inner plate-like portions 3d and 4d are also laid on each other so that these plates are in contact with each other in the perpendicular direction. The innermost part of inner plate-like portion 3d is bent downward into C-shape so that inner plate-like portion 3d is caulked to inner plate-like portion 4d to form a caulked portion 8. Caulked portions 7 and 8 are provided along the entire outermost and innermost edges of two cages 3 and 4.

Two cages 3 and 4 are thus firmly integrated into a unit by caulking of the outermost and innermost edges with caulked portions 7 and 8. Therefore, two cages 3 and 4 are never separated from each other during a drive. Moreover, a large area of contact between the end surfaces of needle rollers 2 and pockets 5 and 6 is secured in regions of outer plate-like portions 3b and 4b and inner plate-like portions 3d and 4d so that drilling wear can be reduced.

When two cages 3 and 4 are fixed, a thickness $T_1$, in the perpendicular direction, of the radially outer part of the cages and a thickness $T_2$, in the perpendicular direction, of the radially inner part thereof are smaller than a thickness $T_0$ in the perpendicular direction of roller holder portions 5a and 6a of two cages 3 and 4, because of the presence of sloping extensions 3a, 4a, 3c and 4c. In other words, between caulked portions 7 and 8 and corresponding ends of needle rollers 2, there are provided flat portions (outer plate-like portions 3b and 4b and inner plate-like portions 3d and 4d) having a cross-sectional height smaller than that of roller holder portions 5a and 6a.

Figure 4:
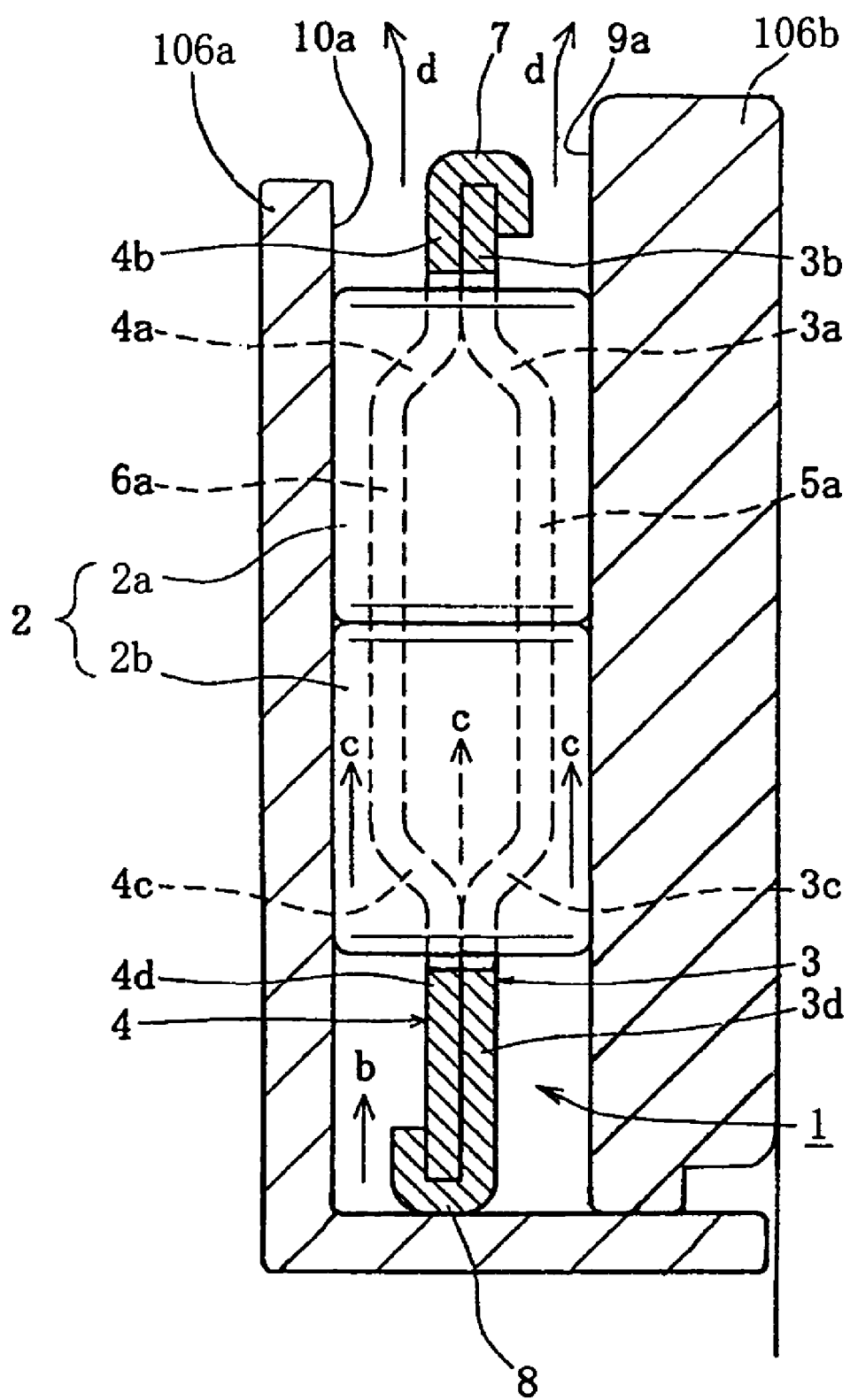
FIG. 4 is an enlarged view of the thrust needle roller bearing and therearound shown in FIG. 1.

As shown in FIG. 4 for example, thrust needle roller bearing 1 structured as discussed above is clearance fit by using caulked portion 8 of upper cage 3 as a guide surface, so that needle rollers 2 roll between a raceway surface 9a of race 106b attached to the stator and a raceway surface 10a of race 106a attached to the turbine (or the raceway surface of the race attached to the impeller and the raceway surface of the race attached to the stator). As race 106a rotates, cages 3 and 4 accordingly rotate with this race 106a so that needle rollers 2 roll between raceway surface 10a of race 106a and raceway surface 9a of race 106b. Here, a lubricating oil is supplied from a hydraulic source (not shown) through an oil path into thrust needle roller bearing 1.

The lubricating oil is supplied from the radially inner side of thrust needle roller bearing 1 as indicated by arrow b, thereafter passed through a space formed by the outer surfaces of needle rollers 2 and cages 3 and 4 as indicated by arrow c, lubricates the portions between the side surfaces of needle rollers 2 and roller holder portions 5a and 6a of cages 3 and 4, between end surfaces of needle rollers 2 and cages 3 and 4, and between the side surfaces of needle rollers 2 and raceway surfaces 9a and 10a, and is then discharged as indicated by arrow d through the portion between raceway surface 10a and the radially outer portion of cage 4 with respect to roller holder portion 6a and through the portion between raceway surface 9a and the radially outer portion of cage 3 with respect to roller holder portion 5a.

Regarding the lubrication of the above-described portions by the lubricating oil, since the perpendicular thicknesses $T_1$ and $T_2$ of the radially outer and inner portions of roller holder portions 5a and 6a of two cages 3 and 4 are made smaller than the perpendicular thickness $T_0$ of roller holder portions 5a and 6a (see FIG. 2C) and accordingly the cross-sectional area of the space formed between raceway surface 10a of race 106a and the radially inner portion of lower cage 4 with respect to roller holder portion 6a is larger than conventional ones, not only the outflow of the lubricating oil but also the inflow of the lubricating oil is enhanced. Seizure of any part of the bearing can surely be prevented and drilling wear of the end surfaces of needle rollers 2 and pockets 5 and 6 of cages 3 and 4 can be reduced. Moreover, since the lubricating oil is less prone to be hindered from passing by cages 3 and 4, the lubricating oil hardly stays. Then, any increase of the oil temperature can be reduced, the strength of the cages is increased and the durability of the bearing can further be improved.

A procedure for manufacturing the above-described thrust needle roller bearing 1 is detailed below.

Figure 5:
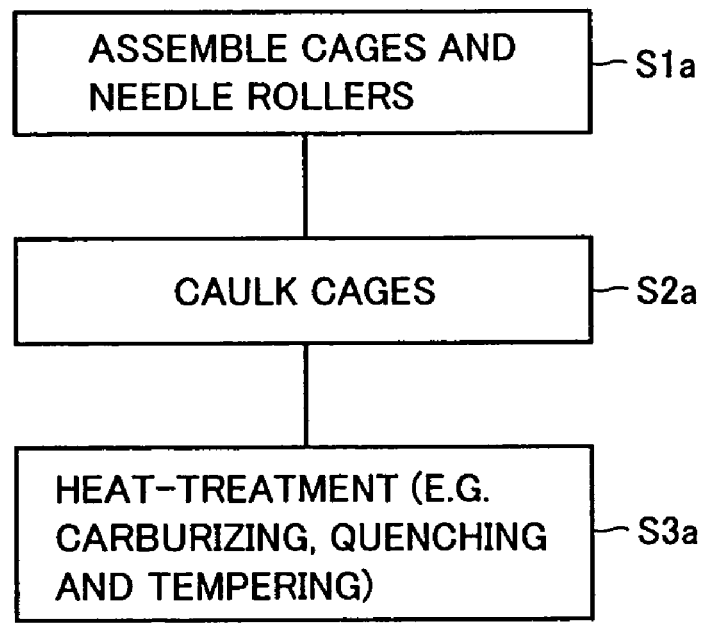
FIG. 5 shows a procedure for manufacturing the thrust needle roller bearing shown in FIGS. 2A–2E, 3 and 4.

FIG. 5 shows a procedure for manufacturing the thrust needle roller bearing according to the first embodiment of the present invention. Referring to FIG. 5, two cages 3 and 4 and needle rollers 2 that have been quenched and tempered or have not been quenched are set. Specifically, the cages and needle rollers are assembled in such a manner that roller holder portions 5a and 6a formed respectively at pockets 5 and 6 of two cages 3 and 4 hold needle rollers 2 therebetween in the direction from above and below (step S1a). Then, the outermost part of outer plate-like portion 4b is bent upward into C-shape to form caulked portion 7 while the innermost part of inner plate-like portion 3d is bent downward into C-shape to form caulked portion 8, and accordingly two cages 3 and 4 are integrated into a unit and fixed (step S2a). Here, needle rollers 2 are made of, for example, a SUJ bearing steel which is a high carbon chromium bearing steel of type 1 or type 2, and the steel is oil-quenched at a temperature of 840° C. for 30 minutes and then tempered at a temperature of 180° C. for 90 minutes to adjust the surface hardness to approximately 700–750 by Vickers hardness (Hv).

After this, with needle rollers 2 and two cages 3 and 4 being set as described above, they are heat-treated (e.g. carburized, quenched and tempered or quenched and tempered after carbonitrided) (step S3a). A thrust needle roller bearing is thus produced. In this case, the carburization is done, for example, by carburization for example at a temperature of 850° C. for 35 minutes (in RX gas atmosphere), quenching in oil, and then tempering at a temperature of 165° C. for 60 minutes. The carbonitriding is done, for example, by carbonitriding in a carbonitriding atmosphere (1–3% by volume of ammonia is added to the RX gas) at a temperature of 840–850° C. for 35 minutes and subsequent quick cooling in oil or gas.

Here, two cages 3 and 4 may be improved in strength by being soft-nitrided in advance at a temperature of 570–580° C. for 35 minutes. No preliminary heat-treatment may be performed on needle rollers 2. However, if needle rollers 2 are subjected to heat treatment or through quenching in advance before being assembled, an advantage is obtained that the strength is further improved by the subsequent carburizing or carbonitriding while a disadvantage of an increase of the manufacturing steps is accompanied. At any rate, as compared with conventionally employed processes in which two cages 3 and 4 and needle rollers 2 are separately heat-treated and the caulked portions are annealed, the manufacturing process is simplified.

Figure 6:
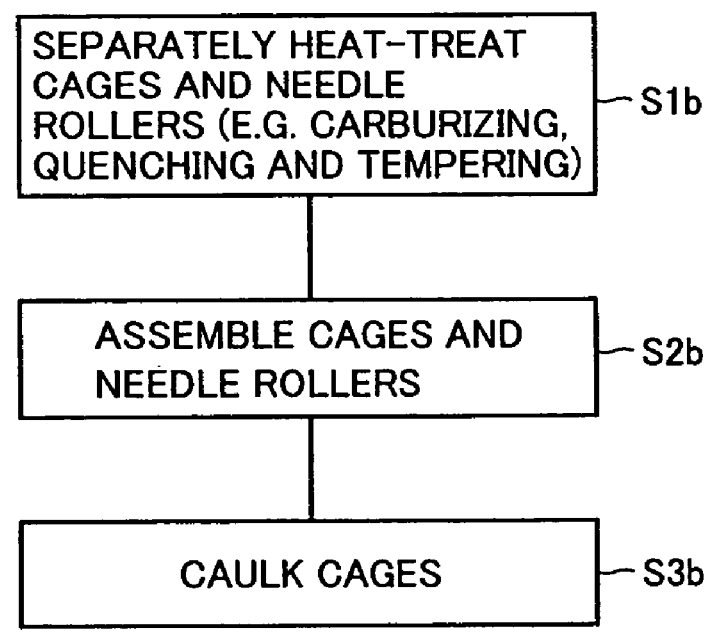
FIG. 6 shows another procedure for manufacturing the thrust needle roller bearing shown in FIGS. 2A–2E, 3 and 4.

If the soft-nitriding of cages 3 and 4 is done, the process shown in FIG. 6 may be used. Namely, cages 3 and 4 and needle rollers 2 are separately heat-treated (e.g. carburized, quenched and tempered or carbonitrided and then quenched and tempered) (step S1b), cages 3 and 4 and needle rollers 2 are set (step S2b) and thereafter cages 3 and 4 are caulked (step S3b).

Thrust needle roller bearing 1 which is manufactured through the above-describe procedure can offer specific characteristics that are described in detail below.

With regard to needle rollers 2, the surface layer thereof is a carburized or carbonitrided layer and thus the hardness of the surface layer is higher than that of conventional ones. Therefore, even if high-hardness foreign matters are caught in rollers, indentations are hardly made, which contributes to extension of the lifetime. In the carbonitriding process, a nitrogen-rich layer is formed and such a large amount of retained austenite as 20% by volume can be obtained. This feature contributes to an increase of the hardness as well as an extension of the lifetime since the large amount of retained austenite plastically deforms to alleviate stress concentration, which occurs in conventional bearings when a high-hardness foreign matter is caught between raceway surfaces 9a and 10a that leaves an indentation resulting in a source of stress concentration around the indentation. Here, the nitrogen-rich layer may specifically be at least 0.1 mm in thickness and at least 750 Hv in surface hardness. Moreover, the internal hardness can be increased to be almost equal to the surface hardness so that the strength of the entire needle rollers can be improved. Accordingly, when used under harsh conditions, for example, heavy load, the product of the present invention can sufficiently endure the load and satisfy a desired lifetime.

With regard to cages 3 and 4, as needle rollers 2, the surface layer of the cages is a carburized layer or carbonitrided layer, and a surface hardness of at least 400 Hv, or at least 600 Hv can be achieved depending on conditions of heat-treatment. The wear resistance can thus be enhanced as compared with conventional products.

Second Embodiment

This embodiment has its structure different from that of the first embodiment only in the shape of cages and caulking method. It is noted that the same or similar components or parts to those of the first embodiment are denoted by like reference characters and description thereof is not repeated here.

Figure 7A:
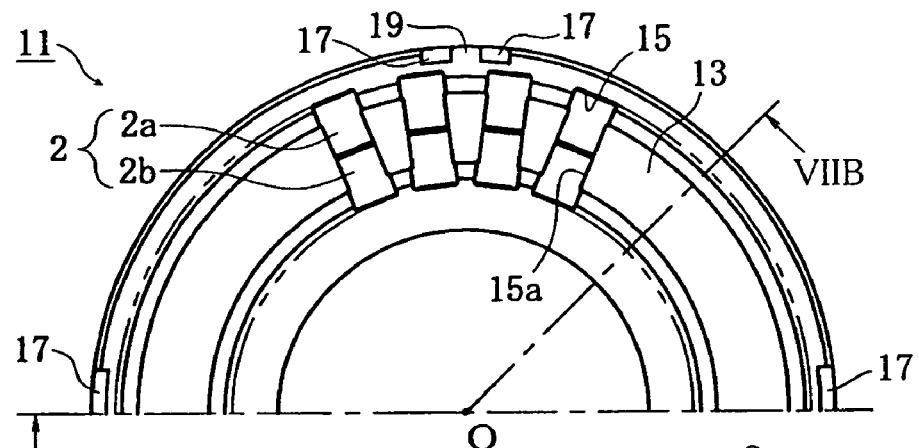
FIG. 7A is a plan view showing a support structure carrying a thrust load of a transmission according to a second embodiment of the present invention.
Figure 7B:
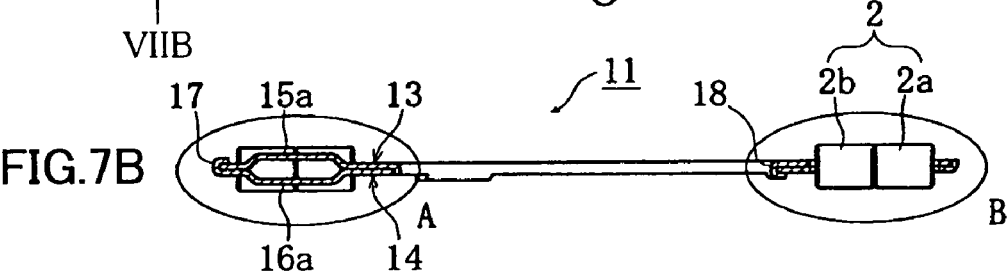
FIG. 7B is a cross-sectional view along line VIIB-O-VIIB in FIG. 7A.
Figure 7C:
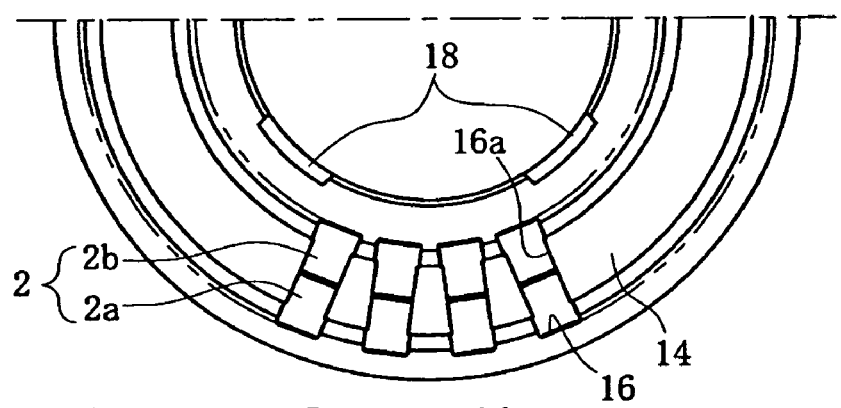
FIG. 7C is a bottom view of FIG. 7A.
Figure 7D:
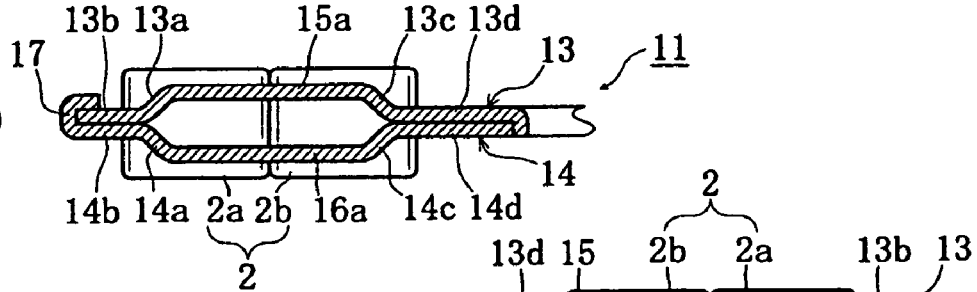
FIG. 7D is an enlarged view of a portion A in FIG. 7B.

Referring to FIGS. 7A–7E, thrust needle roller bearing 11 applied to a support structure which carries a thrust load of the transmission has a plurality of needle rollers 2 and two annular cages 13 and 14 that hold these needle rollers 2 at predetermined pitches in the circumferential direction. As shown in FIG. 7D, the upper one of two cages 13 and 14, namely upper cage 13, includes a roller holder portion 15a having its radially outer portion which includes a sloping extension 13a formed by bending the outer end of roller holder portion 15a and an outer plate-like portion 13b formed by bending the lower end of sloping extension 13a in the radial direction.

Roller holder portion 15a of upper cage 13 also has its radially inner portion which includes a sloping extension 13c formed by bending the inner end of roller holder portion 15a and an inner plate-like portion 13d formed by bending the lower end of sloping extension 13c in the radial direction.

Lower cage 14 with pockets punched with the same die as that for upper cage 13 has roller holder portion 16a with its radially outer portion including a sloping extension 14a formed by bending the outer end of roller holder portion 16a and an outer plate-like portion 14b formed by bending the outer end of sloping extension 14a in the radial direction. Roller holder portion 16a of lower cage 14 has its radially inner portion including a sloping extension 14c formed by bending the inner end of roller holder portion 16a and an inner plate-like portion 14d formed by bending the inner end of sloping extension 4c in the radial direction.

As shown in FIG. 7D, respective outer plate-like portions 13b and 14b of two cages 13 and 14 are laid on each other so that these plates are in contact with each other in the direction perpendicular to the radial direction (herein perpendicular direction). The outermost part of outer plate-like portion 14b is partially bent upward into C-shape so that outer plate-like portion 14b is caulked partially to outer plate-like portion 13b to form partially caulked portions 17. Inner plate-like portions 13d and 14d are also laid on each other so that these plates are in contact with each other in the perpendicular direction, and the innermost part of inner plate-like portion 13d is bent downward.

Figure 7E:
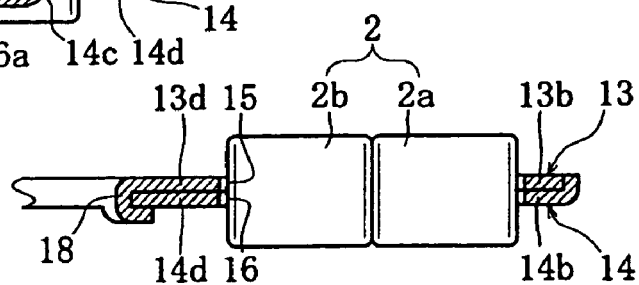
FIG. 7E is an enlarged view of a portion B in FIG. 7B.

Further, as shown in FIG. 7E, outer plate-like portions 13b and 14b are laid on each other so that they are in contact with each other in the perpendicular direction and the outermost part of outer plate-like portion 14b is bent upward. Inner plate-like portions 13d and 14d are laid on each other so that they are in contact with each other in the perpendicular direction and the innermost part of inner plate-like portion 13d is partially bent downward into C-shape so that inner plate-like portion 13d is partially caulked to inner plate-like portion 14d to form partially caulked portions 18. With these partially caulked portions 17 and 18, the inner and outer edges of two cages 13 and 14 are firmly integrated and, in this case, the manufacturing process can remarkably be simplified as compared with the caulking of the entire periphery of the thrust needle roller bearing (FIGS. 2A–2E) of the first embodiment described above.

An alignment part 19 for alignment between two cages 13 and 14 includes, for example, a notch (not shown) made in the outer rim of upper cage 13 and a projection (not shown) formed on the outer rim of lower cage 14, and the projection and the notch are engaged with each other so as to prevent displacement of pitches of pockets 15 and 16 of cages 13 and 14 in the caulking process for example. Those partially caulked portions 17 and 18 are arranged at four positions on the periphery with a phase difference of 45° between the caulked portions. In this way, deformation of the cages in the caulking process is reduced. Here, the number of positions where the caulked portions are placed is not limited to four. In terms of the strength, the caulked portions may be arranged at two or more positions (e.g. five to eight positions) at regular intervals. Then, deformation of the cages in the caulking process can be reduced.

Third Embodiment

This embodiment differs in structure from the second embodiment only in the direction of the caulking. It is noted that the same or similar components or parts to those of the second embodiment are denoted by like reference characters and detailed description thereof is not repeated here.

Figure 8A:
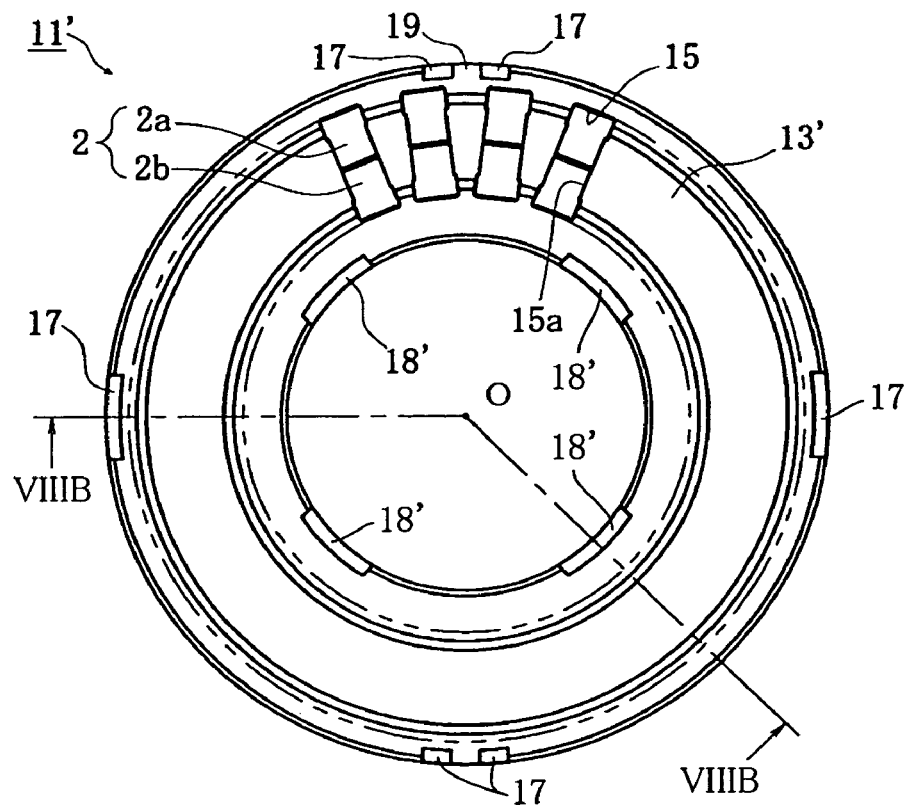
FIG. 8A is a plan view showing a support structure carrying a thrust load of a transmission according to a third embodiment of the present invention.
Figure 8B:
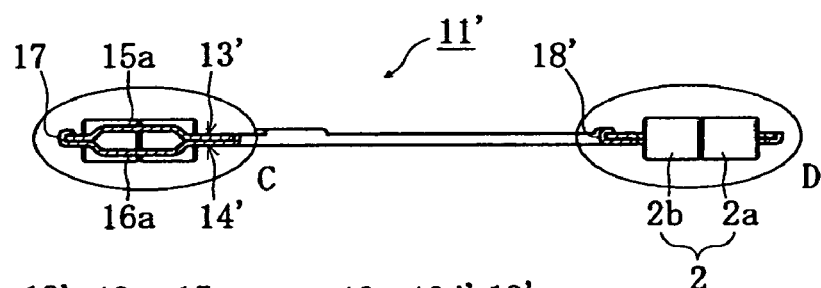
FIG. 8B is a cross-sectional view along line VIIIB-O-VIIIB in FIG. 8A.
Figure 8C:
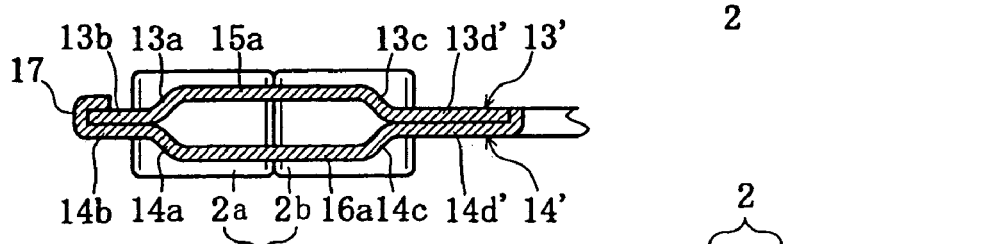
FIG. 8C is an enlarged view of a portion C in FIG. 8B.

Referring to FIGS. 8A–8D, thrust needle roller bearing 11' applied to a support structure which carries a thrust load of the transmission has a plurality of needle rollers 2 and two annular cages 13' and 14' that hold these needle rollers 2 at predetermined pitches in the circumferential direction. Of two cages 13' and 14', upper cage 13' includes a roller holder portion 15a which has its radially outer portion including, as shown in FIG. 8C, a sloping extension 13a formed by bending the outer end of roller holder portion 15a and an outer plate-like portion 13b formed by bending the lower end of sloping extension 13a in the radial direction. Roller holder portion 15a of upper cage 13 also has its radially inner portion including a sloping extension 13c formed by bending the inner end of roller holder portion 15a and an inner plate-like portion 13d' formed by bending the lower end of sloping extension 13c in the radial direction.

Lower cage 14 includes a roller holder portion 16a having its radially outer portion including a sloping extension 14a formed by bending the outer end of roller holder portion 16a and an outer plate-like portion 14b formed by bending the outer end of sloping extension 14a in the radial direction. Roller holder portion 16a of lower cage 14 also has its radially inner portion including a sloping extension 14c formed by bending the inner end of roller holder portion 16a and an inner plate-like portion 14d' formed by bending the inner end of sloping extension 14c in the radial direction.

As shown in FIG. 8C, outer plate-like portions 13b and 14b of two cages 13' and 14' are laid on each other so that they are in contact with each other in the perpendicular direction, and the outermost part of outer plate-like portion 14b is partially bent upward into C-shape to partially caulk outer plate-like portion 14b to outer plate-like portion 13b and thereby form partially caulked portions 17. On the other hand, inner plate-like portions 13d' and 14d' are laid on each other so that they are in contact with each other in the perpendicular direction and the innermost part of inner plate-like portion 14d' is bent upward.

Figure 8D:
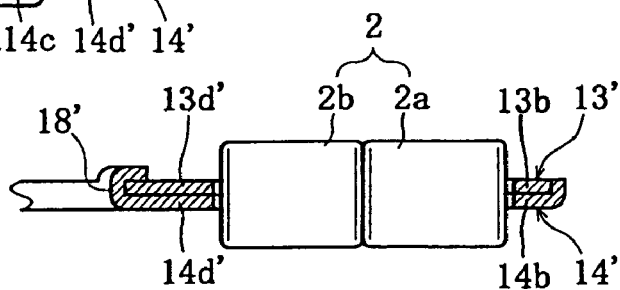
FIG. 8D is an enlarged view of a portion D in FIG. 8B.

Further, as shown in FIG. 8D, inner plate-like portions 13d40 and 14d' are laid on each other so that they are in contact with each other in the perpendicular direction and the innermost part of inner plate-like portion 14d' is partially bent upward into C-shape to partially caulk inner plate-like portion 14d' to inner plate-like portion 13d' and thereby form partially caulked portions 18'. On the other hand, outer plate-like portions 13b and 14b are laid on each other so that they are in contact with each other in the perpendicular direction and the outermost part of outer plate-like portion 14b is bent upward.

These partially caulked portions 17 and 18' allow two cages 13' and 14' to firmly be integrated on the inner and outer ends. In addition, the presence of partially caulked portions 17 and 18' on the same plane can further facilitate the caulking process, as compared with the partial caulking of the above-described second embodiment.

Fourth Embodiment

This embodiment differs in structure from the above-discussed first to third embodiments only in the means for fixing the two cages. It is noted that the same or similar components or parts to those of the first to third embodiments are denoted by like reference characters and description thereof is not repeated here.

Figure 9A:
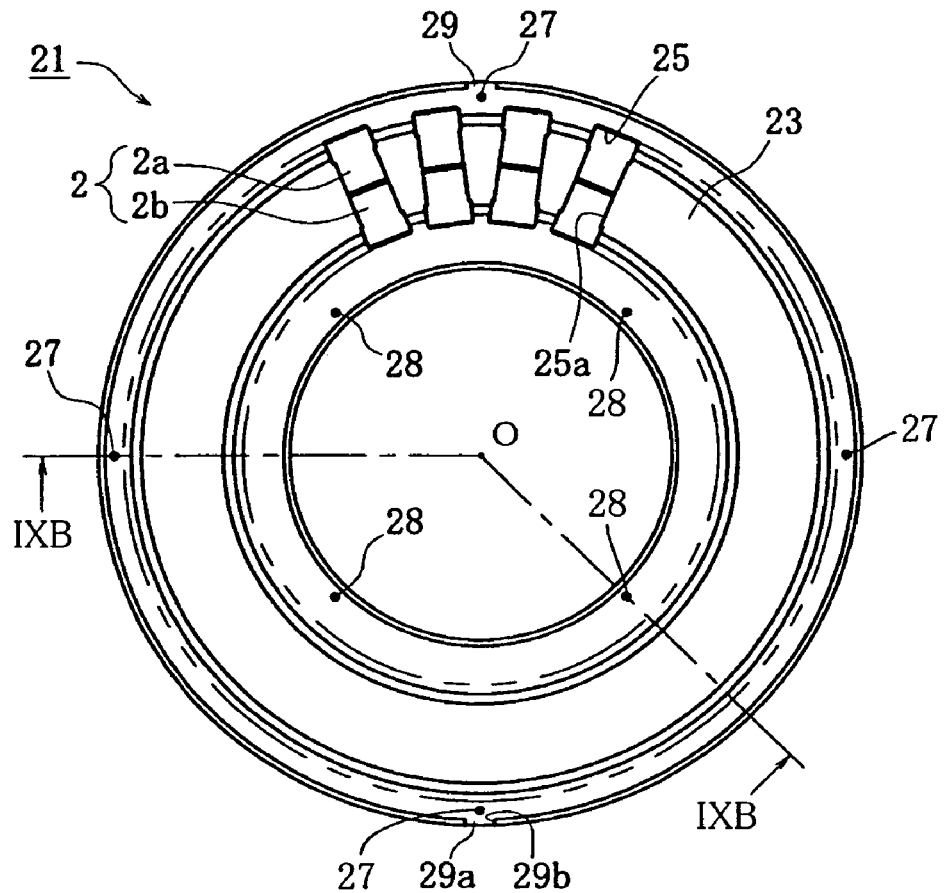
FIG. 9A is a plan view showing a support structure carrying a thrust load of a transmission according to a fourth embodiment of the present invention.
Figure 9B:
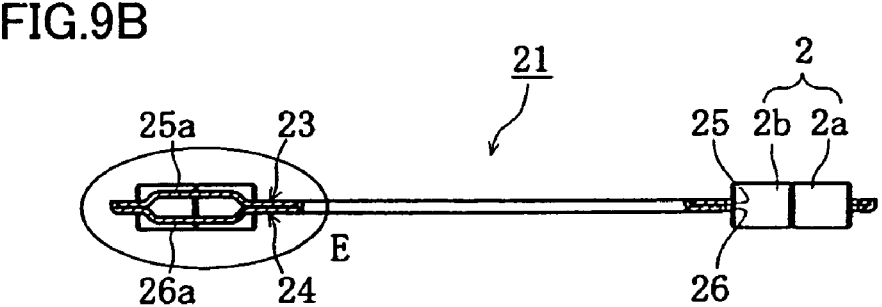
FIG. 9B is a cross-sectional view along line IXB-O-IXB in FIG. 9A
Figure 9C:
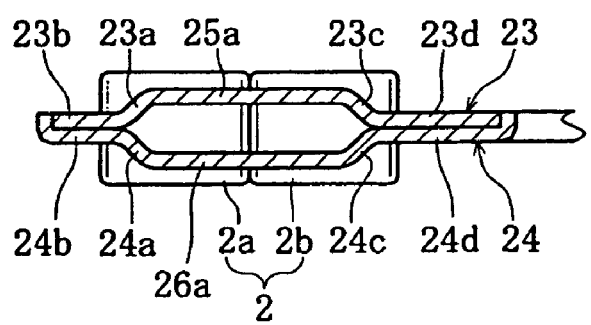
FIG. 9C is an enlarged view of a portion E in FIG. 9B.

Referring to FIGS. 9A–9C, thrust needle roller bearing 21 applied to a support structure which carries a thrust load of the transmission has a plurality of needle rollers 2 and two annular cages 23 and 24 that hold these needle rollers 2 at predetermined pitches in the circumferential direction. Of two cages 23 and 24, upper cage 23 has a roller holder portion 25a with its radially outer portion including a sloping extension 23a formed by bending the outer end of roller holder portion 25a and an outer plate-like portion 23b formed by bending the lower end of sloping extension 23a in the radial direction, as shown in FIG. 9C. The radially inner portion of roller holder portion 25a of upper cage 23 has a sloping extension 23c formed by bending the inner end of roller holder portion 25a and an inner plate-like portion 23d formed by bending the lower end of sloping extension 23c in the radial direction.

Lower cage 24 has its roller holder portion 26a having a radially outer portion including a sloping extension 24a formed-by bending the outer end of roller holder portion 26a and an outer plate-like portion 24b formed by bending the outer end of sloping extension 24a in the radial direction. Roller holder portion 26a of lower cage 24 also has its radially inner portion including a sloping extension 24c formed by bending the inner end of roller holder portion 26a and an inner plate-like portion 24d formed by bending the inner end of sloping extension 24c in the radial direction.

As shown in FIG. 9C, outer plate-like portions 23b and 24b of two cages 23 and 24 are laid on each other so that they are in contact with each other in the perpendicular direction and the outermost part of outer plate-like portion 24b is bent upward. On the other hand, inner plate-like portions 23d and 24d are laid on each other so that they are in contact with each other in the perpendicular direction and the innermost part of inner plate-like portion 24d is bent upward. The innermost part of inner plate-like portion 23d may be bent downward. According to this embodiment, the inner periphery and the outer periphery of two cages 23 and 24 are integrally fixed at spot-welded portions 27 and 28 as shown in FIG. 9A. These welded portions 27 and 28 are arranged at four positions at regular intervals in the circumferential direction with a phase difference of 45° between the welded portions. Any deformation of the cages due to the welding is thus reduced. Here, the number of positions where the welding is done is not limited to four. In terms of the strength, at least two (e.g. five to eight) spot-welded positions at regular intervals can reduce the deformation of the cages due to the welding.

An alignment part 29 for alignment between two cages 23 and 24 includes a projection 29a formed on the outer rim of upper cage 23 and a notch 29b formed in the outer rim of lower cage 24, and these projection 29a and notch 29b are engaged with each other in order to prevent displacement of phases of pockets 25 and 26 of two cages 23 and 24. The structure of this alignment part 29 is not limited to the above-described one. For example, so-called staking method may be applied according to which the outer rim of lower cage 24 is partially caulked to be engaged with upper cage 23 and accordingly fixed, or engaging by a pin and a hole may be applied.

Fifth Embodiment

The first embodiment described above concerns the support structure which carries a thrust load in the torque converter portion of a transmission. The thrust needle roller bearings of the first to fourth embodiments, however, may be employed as those carrying a thrust load in a gear mechanism of a transmission. Description is now given of the thrust needle roller bearing of the first embodiment that is applied to a support structure carrying a thrust load in a gear mechanism of a transmission.

Figure 10:
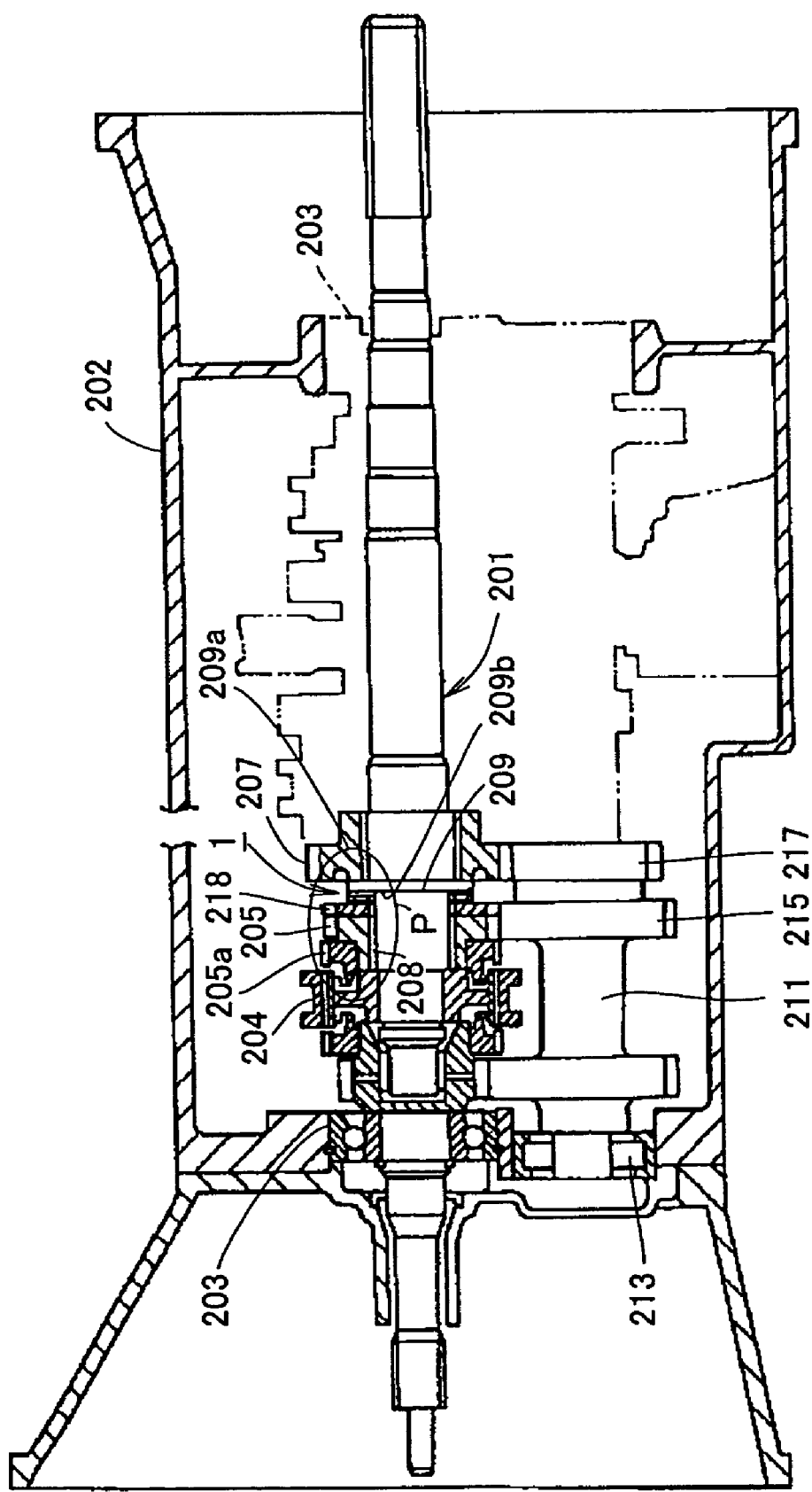
FIG. 10 is a schematic cross-sectional view showing a support structure which carries a thrust load of a gear mechanism of a transmission according to a fifth embodiment of the present invention.
Figure 11:
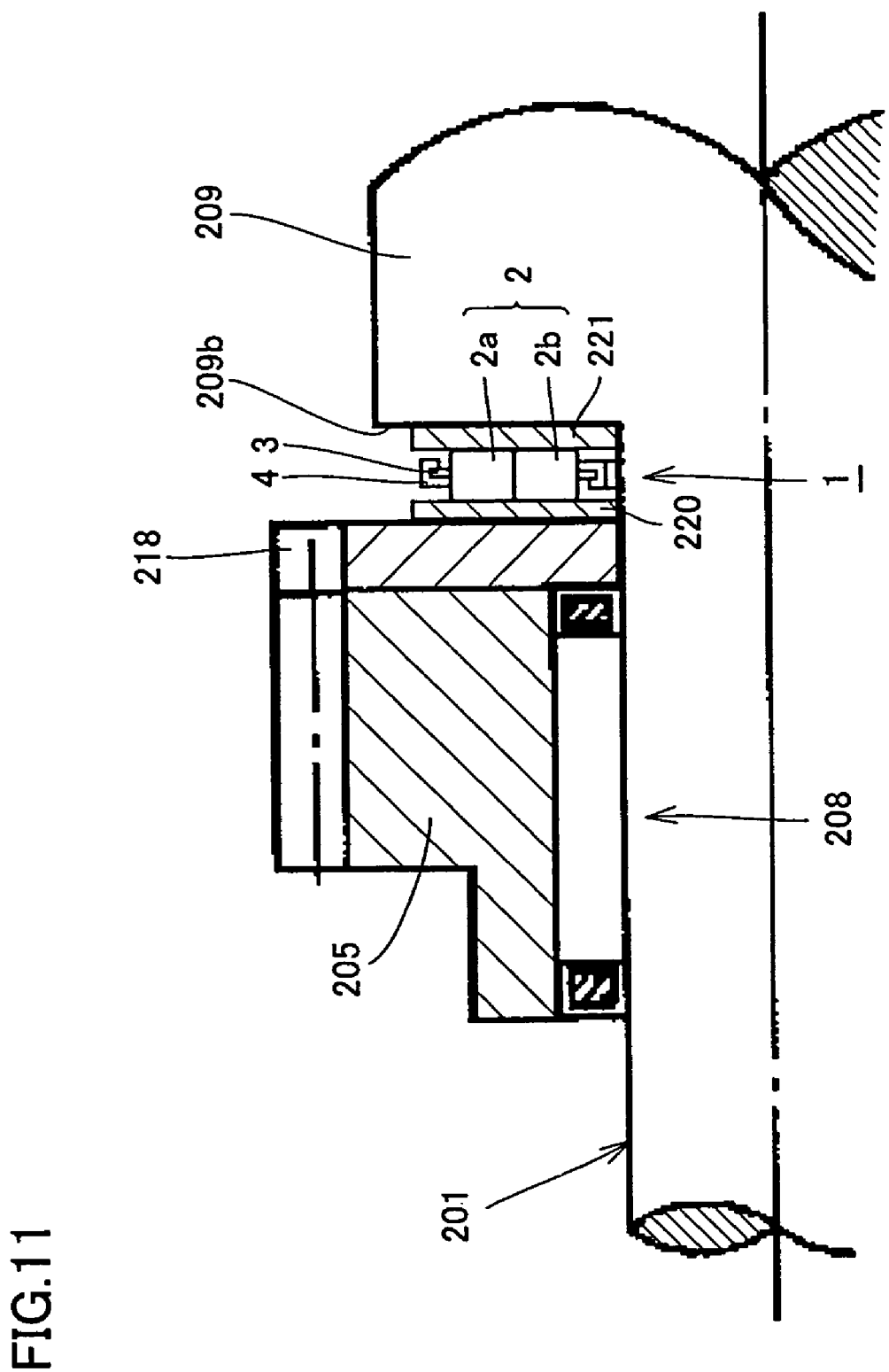
FIG. 11 is a schematic cross-sectional view showing a region P in FIG. 10 in an enlarged form.

Referring to FIGS. 10 and 11, a shaft serving as a main shaft 201 is rotatably supported by bearings 203 located to front and back thereof in a case 202. Around shaft 201, a synchro hub 204 is provided and an idle gear 205 adjacent to one side of the hub is rotatably provided via a rolling bearing 208. Idle gear 205 serving as a three-speed main gear has a clutch gear 205a between itself and synchro hub 204. On the right of the three-speed main gear, namely idle gear 205, a radially-expanded portion 209 is formed around shaft 201. On the right of this radially-expanded portion 209, another idle gear 207 is rotatably mounted on shaft 201 via a rolling bearing so that idle gear 207 is in contact with a right step surface 209a. This idle gear 207 serves as a two-speed main gear which is to be engaged/disengaged with/from another synchro hub.

A shaft serving as a counter shaft 211 placed in parallel to shaft 201 is rotatably supported in case 202 by a bearing 213 for example. To this shaft 211, gears 215 and 217 engaging with idle gears 205 and 207 on shaft 201 are fixed.

Between an end panel of idle gear 205 serving as the three-speed main gear and a left step surface 209b of radially-expanded portion 209 of main shaft 201, a scissors gear (intervening gear) 218 is provided that is the same in diameter as idle gear 205 and slightly different in number of teeth from idle gear 205. This scissors gear 218 is rotatably mounted on shaft 201 so that this gear is in contact with the end panel of idle gear 205. These idle gear 205 and scissors gear 218 mesh with the same gear 215 on counter shaft 211. Here, scissors gear 218 may be any which can mesh with the same gear 215 with which idle gear 205 meshes. In this embodiment, the pitch circle, the addendum circle and the dedendum circle of scissors gear 218 have respective diameters that are the same as those of idle gear 205. Preferably, the number of teeth of scissors gear 218 differs from that of idle gear 205 by at least one. Between scissors gear 218 and left step surface 209b of radially-expanded portion 209, a thrust needle roller bearing 1 serving as a support structure is provided.

This thrust needle roller bearing 1 has, as that of the first embodiment, needle rollers 2, two cages 3 and 4 and races 220 and 221. In most cases, gear-contacting race 220 of thrust needle roller bearing 1 that is in contact with scissors gear 218 is rotatable with respect to shaft 201 while race 221 contacting left step surface 209b of radially-expanded portion 209 is fixed to shaft 201 by means of a key for example.

Needle rollers 2 of thrust needle roller bearing 1 include needle rollers 2a and 2b arranged in two rows.

In a shift state, namely when synchro hub 204 engages with clutch gear 205a of idle gear 205, shaft 201 and idle gear 205 rotate in synchronization with each other, while shaft 201 and scissors gear 218 relatively rotate since the number of teeth of scissors gear 218 is slightly different from that of idle gear 205. Then, gear-contacting race 220 and shaft-fixed race 221 of thrust needle roller bearing 1 relatively rotate and accordingly needle rollers 2 make rotational and orbital motions.

Although the thrust needle roller bearing of the first embodiment is applied to the gear mechanism of the transmission in the description above, any of the thrust needle roller bearings of the second to fourth embodiment may be applied thereto.

Figure 12A:
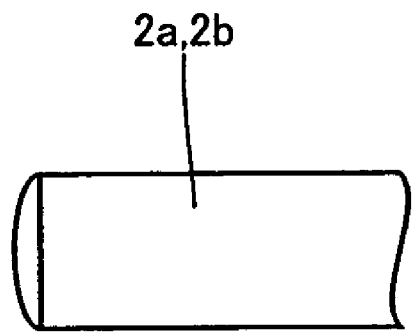
FIGS. 12A and 12B illustrate respective shapes of end surfaces of needle rollers.
Figure 12B:
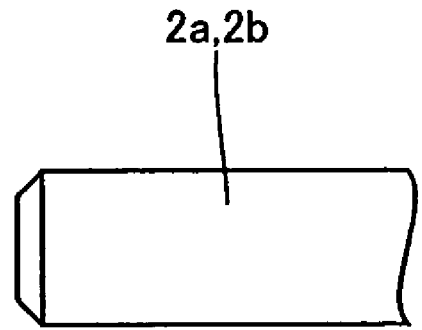

According to the first to fifth embodiments described above, preferably needle rollers 2a and 2b have an end shape represented by symbol "A" (round) defined by JIS (Japanese Industrial Standards) as shown in FIG. 12A, an end shape represented by symbol "F" (flat) defined by JIS as shown in FIG. 12B, or an end shape of a combination of those represented respectively by symbols "A" and "F" defined by JIS.

In addition, although the embodiments are described in connection with the automatic transmission, the present invention is applicable to thrust support structures used widely for any transmissions of various types. In particular, the present invention is applicable to the thrust support structure for use in an oil (lubricating oil) containing an additive for the transmission.

Moreover, although the above-described support structures are attached between the turbine and the stator and between the stator and the impeller, the present invention is not limited to this. The present invention is applicable to any portion of other transmissions that carries a thrust.

Sixth Embodiment

Figure 13:
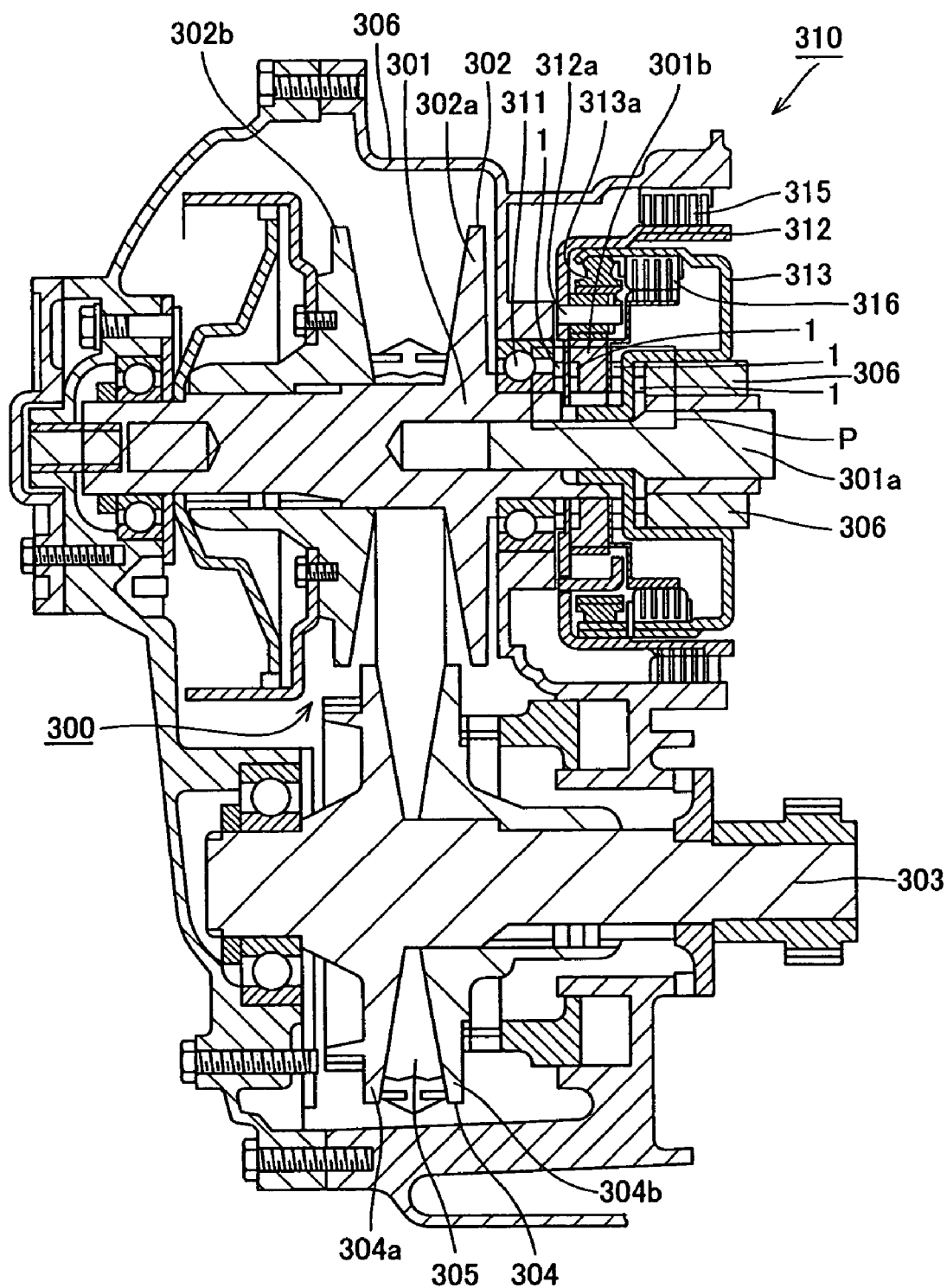
FIG. 13 is a schematic cross-sectional view showing a support structure for a continuously variable transmission according to a sixth embodiment of the present invention.

Referring to FIG. 13, a driving force generated by an engine (not shown) is transmitted from a crankshaft (not shown) to a continuously variable transmission (CVT) mechanism 300, through a torque converter (not shown) and a forward/reverse switching mechanism 310.

Forward/reverse switching mechanism 310 has a planetary gear mechanism and multi-plate clutches 315 and 316. The planetary gear mechanism has a ring gear 313a fixed to a shaft 301a via a supporting member 313, a sungear 301b fixed to a primary shaft 301, and a planetary pinion 312a rotatably supported by a supporting member 312. This planetary pinion 312a meshes with each of ring gear 313a and sungear 301b.

Multi-plate clutch 315 is incorporated, as a reverse brake, between the outer periphery of supporting member 312 and the inner periphery of a housing 306. Multi-plate clutch 316 is included, as a forward clutch, between the outer periphery of primary shaft 301 and the inner periphery of supporting member 313. Multi-plate clutches 315 and 316 have respective mechanisms capable of supplying an oil pressure.

When an oil pressure is supplied to allow multi-plate clutch (forward clutch) 316 to enter a connection state, rotations of shaft 301a are transmitted in the forward direction to primary shaft 301. When an oil pressure is supplied to allow multi-plate clutch (reverse brake) 315 to enter a connection state, rotations of shaft 301a are transmitted in the reverse direction to primary shaft 301. In this way, the forward and backward motions can be controlled.

CVT mechanism 300 has primary shaft 301 on the input side coupled with forward/reverse switching mechanism 310, a primary pulley 302 of this primary shaft 301, a secondary shaft 303 on the output side and in parallel with primary shaft 301, a secondary pulley 304 of secondary shaft 303, and a belt 305 looped over both of primary pulley 302 and secondary pulley 304.

Primary pulley 302 has a fixed pulley 302a fixed to primary shaft 301, and a movable pulley 302b mounted oppositely to the fixed pulley and sidably in the axial direction on primary shaft 301 with a ball spline for example. Movable pulley 302b thus slides in the axial direction so that the distance between cone surfaces of the pulley, namely the groove width of the pulley, can be varied.

Secondary pulley 304 has a fixed pulley 304a fixed to secondary shaft 303 and a movable pulley 304b mounted oppositely to the fixed pulley and sidably in the axial direction on secondary shaft 303 with a ball spline for example. Movable pulley 304b thus slides in the axial direction so that the distance between cone surfaces of the pulley, namely the groove width of the pulley, can be varied.

Respective groove widths of both of the pulleys are varied to change the diameter of contact between belt 305 and pulley 302 and that between belt 305 and pulley 304. Accordingly, the ratio between the diameter of belt 305 wound around pulley 302 and the diameter of belt 305 wound around pulley 304 changes. Rotations of primary shaft 301 are thus continuously varied in speed to be transmitted to secondary shaft 303.

In this embodiment, thrust needle roller bearings are provided for carrying thrust loads of shaft 301a and primary shaft 301 on the input side and secondary shaft 303 on the output side. The thrust needle roller bearings each have needle rollers arranged in two rows.

Figure 14:
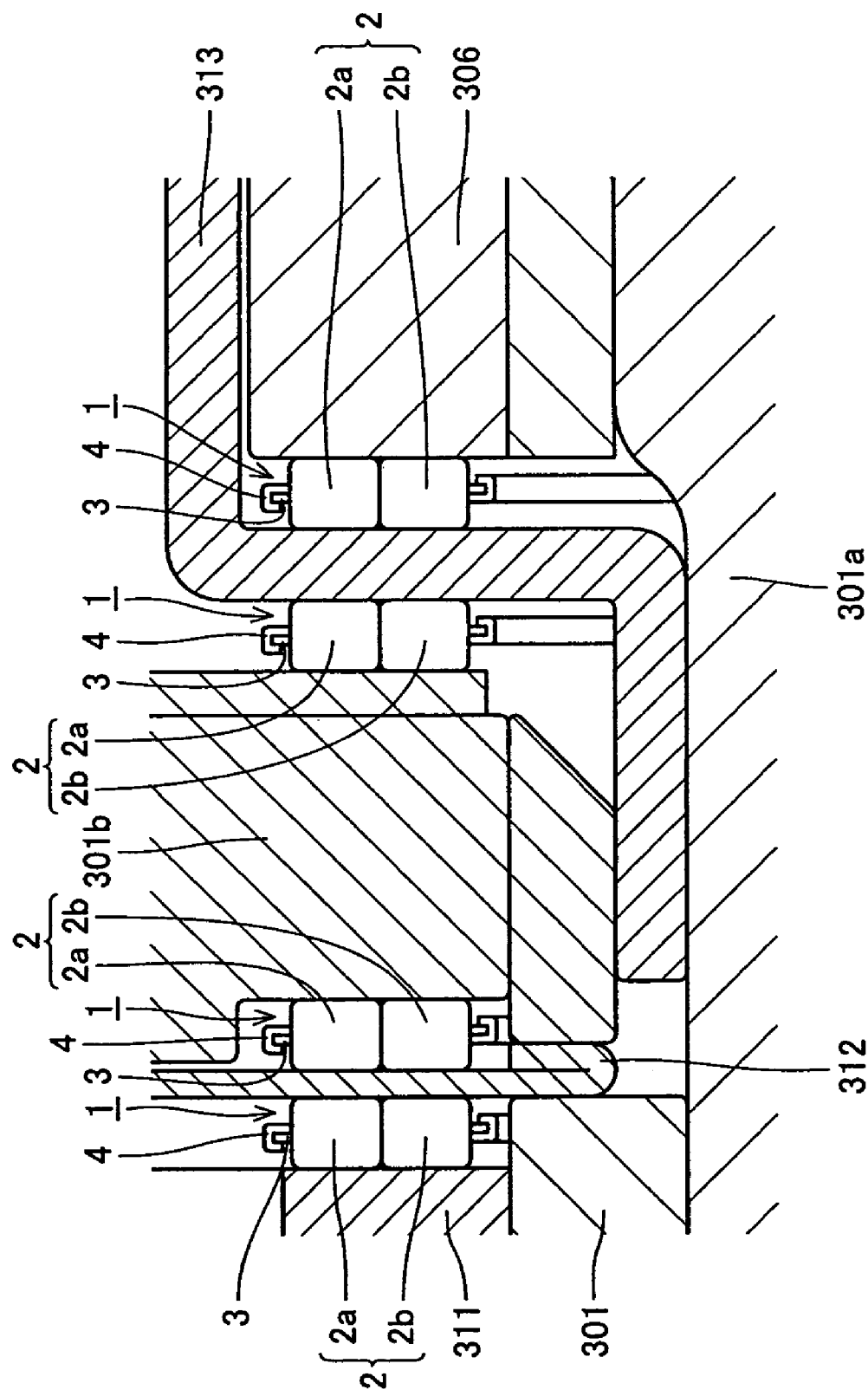
FIG. 14 is a cross-sectional view showing a portion P in FIG. 13 in an enlarged form.

Referring to FIG. 14, thrust needle roller bearings 1 having needle rollers arranged in two rows is provided, for example, between the inner ring of a rolling bearing 311 which rotatably supports primary shaft 301 and supporting member 312, between supporting member 312 and sungear 301b, between sungear 301b and supporting member 313, and between supporting member 313 and housing 306, for example. Each thrust needle roller bearing 1 has needle rollers 2 and two cages 3 and 4 for holding needle rollers 2. Needle rollers 2 include needle rollers 2a and 2b arranged in two rows.

This thrust needle roller bearing 1 has its structure as specifically described below.

Referring to FIGS. 2A-2E and FIG. 3, thrust needle roller bearing 1 has a plurality of needle rollers 2 and two annular cages 3 and 4 that hold these needle rollers 2 at predetermined pitches in the circumferential direction. Two cages 3 and 4 respectively have a plurality of rectangular pockets 5 and 6 with the length in the radial direction larger than the length L of needle rollers 2, and are formed by pressing of a steel plate which is for example a cold-rolled steel plate (SPCC). Roller holder portions 5a and 6a are formed respectively on opposite sides of pockets 5 and 6 to extend toward and face each other. Needle rollers 2 are thus held by roller holder portions 5a and 6a therebetween in the direction from above and below. Instead of cages 3 and 4 as described above, any cages produced through draw-forming of a band steel by means of a press or through shaving may be used.

Needle rollers 2 include needle rollers 2a on the radially outer side and needle rollers 2b on the radially inner side, and are arranged in two rows in pockets 5 and 6. The double-row arrangement reduces a difference in circumferential velocity of revolution between the radially outer part and the radially inner part, and thereby the differential slip between the rollers and the raceway surface (not shown) is reduced. Then, less heat is generated from the contact portion and the surface damage (smearing) can be prevented.

Here, respective lengths L1 and L2 of double-row needle rollers 2a and 2b are equal to each other. These lengths, however, may be selected to satisfy a relation, L2 (length of the radially inner roller)≦L1 (length of the radially outer roller) or L1≦L2 depending on conditions in use. Preferably, the length of radially outer needle roller 2a is longer, for example, 1.2 times as long as the length of radially inner needle roller 2b so that the load capacity on the radially outer part is increased.

As shown in FIG. 2D, the length La in the radial direction of roller holder portions 5a and 6a can be made smaller than the length L of needle rollers so that a lubricating oil can readily pass between needle rollers 2 and cages 3 and 4 through depressions 5b and 6b formed on both ends of roller holder portions 5a and 6a.

Further, as shown in FIG. 2E, respective corners (F) of roller holder portions 5a and 6a may be rounded when pockets 5 and 6 are punched by a press, or may be rounded to become smooth through surface-pressing of the inner rim after the punching. In this way, without breaking a lubricating-oil film formed on the surfaces of needle rollers 2a and 2b, needle rollers 2a and 2b can stably be guided and held.

Here, the corners are "rounded" so that the sharp edges of the corners are removed to become round.

Of two cages 3 and 4, upper cage 3 has its roller holder portion 5a with its radially outer portion including a sloping extension 3a formed by bending the outer end of roller holder portion 5a and an outer plate-like portion 3b formed by bending the lower end of sloping extension 3a in the radial direction. Roller holder portion 5a of cage 3 also has its radially inner portion including a sloping extension 3c formed by bending the inner end of roller holder portion 5a and an inner plate-like portion 3d formed by bending the lower end of sloping extension 3c in the radial direction.

Lower cage 4 with the pockets punched with the same die as that for upper cage 3 has roller holder portion 6a with its radially outer portion including a sloping extension 4a formed by bending the outer end of roller holder portion 6a and an outer plate-like portion 4b formed by bending the outer end of sloping extension 4a. Roller holder portion 6a of lower cage 4 has its radially inner portion including a sloping extension 4c formed by bending the inner end of roller holder portion 6a and an inner plate-like portion 4d formed by bending the inner end of sloping extension 4c.

Respective outer plate-like portions 3b and 4b of two cages 3 and 4 are laid on each other so that these plates are in contact with each other in the direction perpendicular to the radial direction as seen in FIG. 2C (herein referred to as perpendicular direction). The outermost part of outer plate-like portion 4b is bent upward into C-shape so that outer plate-like portion 4b is caulked to outer plate-like portion 3b to form a caulked portion 7. Inner plate-like portions 3d and 4d are also laid on each other so that these plates are in contact with each other in the perpendicular direction. The innermost part of inner plate-like portion 3d is bent downward into C-shape so that inner plate-like portion 3d is caulked to inner plate-like portion 4d to form a caulked portion 8. Caulked portions 7 and 8 are provided along the entire outermost and innermost edges of two cages 3 and 4.

Two cages 3 and 4 are thus firmly integrated into a unit by caulking of the outermost and innermost edges with caulked portions 7 and 8. Therefore, two cages 3 and 4 are never separated from each other during a drive. Moreover, a large area of contact between the end surfaces of needle rollers 2 and pockets 5 and 6 is secured in regions of outer plate-like portions 3b and 4b and inner plate-like portions 3d and 4d so that drilling wear can be reduced.

When two cages 3 and 4 are fixed, a thickness $T_1$, in the perpendicular direction, of the radially outer part of the cages and a thickness $T_2$, in the perpendicular direction, of the radially inner part thereof are smaller than a thickness To in the perpendicular direction of roller holder portions 5a and 6a of two cages 3 and 4, because of the presence of sloping extensions 3a, 4a, 3c and 4c. In other words, between caulked portions 7 and 8 and corresponding ends of needle rollers 2, there are provided flat portions (outer plate-like portions 3b and 4b and inner plate-like portions 3d and 4d) having a cross-sectional height smaller than that of roller holder portions 5a and 6a.

The path of the lubricating oil is described below in connection with, for example, thrust needle roller bearing 1 having the above-described structure and placed between supporting member 313 and housing 306 shown in FIGS. 13 and 14.

Figure 15:
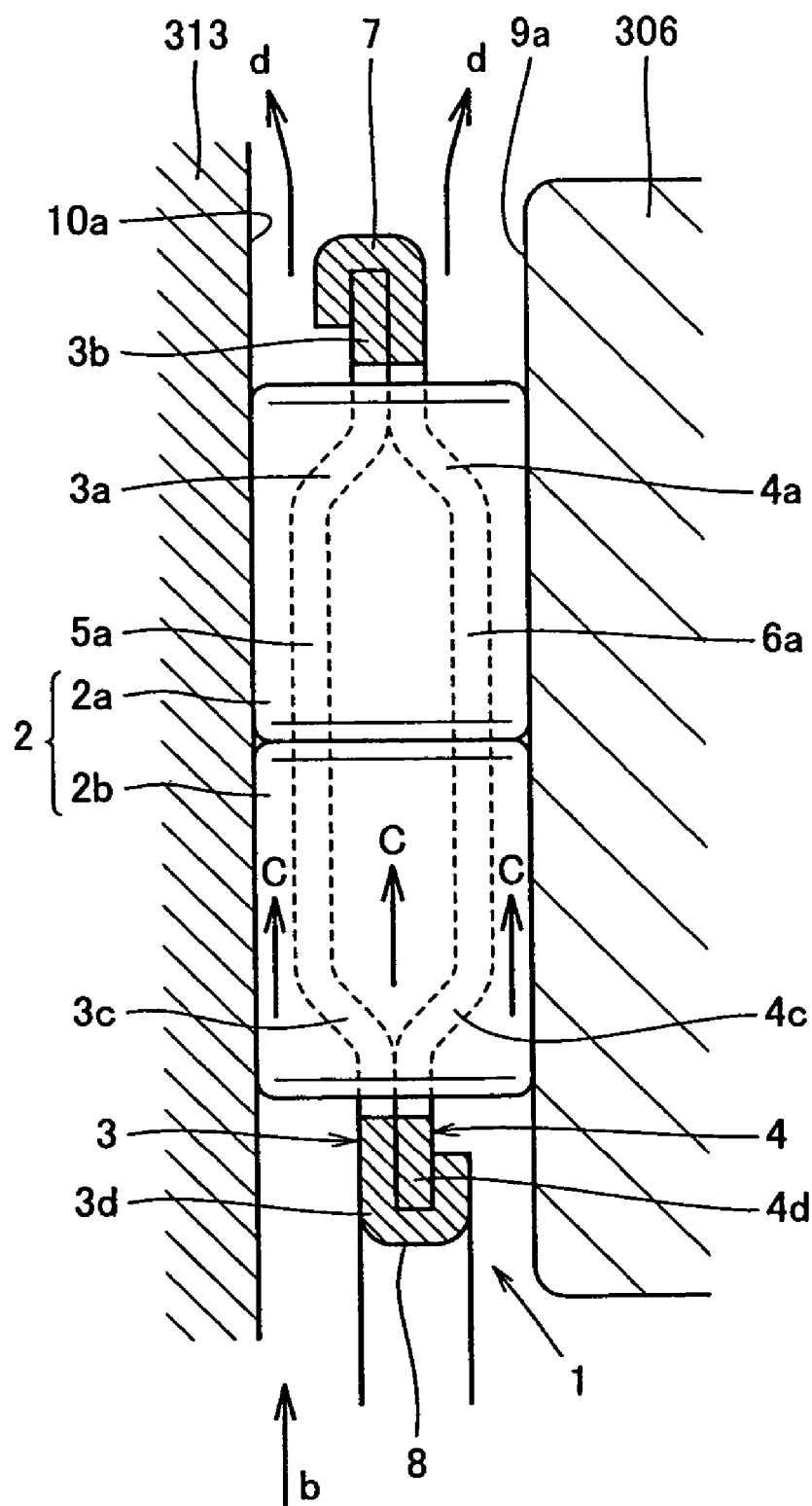
FIG. 15 is an enlarged view of a thrust needle roller bearing and therearound shown in FIGS. 13 and 14.

Referring to FIG. 15, thrust needle roller bearing 1 is clearance fit by using caulked portion 8 of upper cage 3 as a guide surface, so that needle rollers 2 roll between supporting member 313 and housing 306. As supporting member 313 rotates, cages 3 and 4 accordingly rotate with supporting member 313 so that needle rollers 2 roll between raceway surface 10a of supporting member 313 and raceway surface 9a of housing 306. Here, a lubricating oil is supplied from a hydraulic source (not shown) through an oil path into thrust needle roller bearing 1.

The lubricating oil is supplied from the radially inner side of thrust needle roller bearing 1 as indicated by arrow b, thereafter passed through a space formed by the outer surfaces of needle rollers 2 and cages 3 and 4 as indicated by arrow c, lubricates the portions between the side surfaces of needle rollers 2 and roller holder portions 5a and 6a of cages 3 and 4, between end surfaces of needle rollers 2 and cages 3 and 4, and between the side surfaces of needle rollers 2 and raceway surfaces 9a and 10a, and is then discharged as indicated by arrow d through the portion between raceway surface 10a and the radially outer portion of cage 4 with respect to roller holder portion 6a and through the portion between raceway surface 9a and the radially outer portion of cage 3 with respect to roller holder portion 5a.

Regarding the lubrication of the above-described portions by the lubricating oil, since the perpendicular thicknesses $T_1$ and $T_2$ of the radially outer and inner portions of roller holder portions 5a and 6a of two cages 3 and 4 are made smaller than the perpendicular thickness $T_0$ of roller holder portions 5a and 6a (see FIG. 2C) and accordingly the cross-sectional area of the space formed between raceway surface 10a and the radially inner portion of lower cage 4 with respect to roller holder portion 6a is larger than conventional ones, not only the outflow of the lubricating oil but also the inflow of the lubricating oil is enhanced. Seizure of any part of the bearing can surely be prevented and drilling wear of the end surfaces of needle rollers 2 and pockets 5 and 6 of cages 3 and 4 can be reduced. Moreover, since the lubricating oil is less prone to be hindered from passing by cages 3 and 4, the lubricating oil hardly stays. Then, any increase of the oil temperature can be reduced, the strength of the cages is increased and the durability of the bearing can further be improved.

A procedure for manufacturing the above-described thrust needle roller bearing 1 is detailed below.

Referring to FIG. 5, two cages 3 and 4 and needle rollers 2 that have been quenched and tempered or have not been quenched are set. Specifically, the cages and needle rollers are assembled in such a manner that roller holder portions 5a and 6a formed respectively at pockets 5 and 6 of two cages 3 and 4 hold needle rollers 2 therebetween in the direction from above and below (step S1a). Then, the outermost part of outer plate-like portion 4b is bent upward into C-shape to form caulked portion 7 while the innermost part of inner plate-like portion 3d is bent downward into C-shape to form caulked portion 8, and accordingly two cages 3 and 4 are integrated into a unit and fixed (step S2a). Here, needle rollers 2 are made of, for example, a SUJ bearing steel which is a high carbon chromium bearing steel of type 1 or type 2, and the steel is oil-quenched at a temperature of 840° C. for 30 minutes and then tempered at a temperature of 180° C. for 90 minutes to adjust the surface hardness to approximately 700–750 by Vickers hardness (Hv).

After this, with needle rollers 2 and two cages 3 and 4 being set as described above, they are heat-treated (e.g. carburized, quenched and tempered or quenched and tempered after carbonitrided) (step S3a). A thrust needle roller bearing is thus produced. In this case, the carburization is done, for example, by carburization for example at a temperature of 850° C. for 35 minutes (in RX gas atmosphere), quenching in oil, and then tempering at a temperature of 165° C. for 60 minutes. The carbonitriding is done, for example, by carbonitriding in a carbonitriding atmosphere (1–3% by volume of ammonia is added to the RX gas) at a temperature of 840–850° C. for 35 minutes and subsequent quick cooling in oil or gas.

Here, two cages 3 and 4 may be improved in strength by being soft-nitrided in advance at a temperature of 570–580° C. for 35 minutes. No preliminary heat-treatment may be performed on needle rollers 2. However, if needle rollers 2 are subjected to heat treatment or through quenching in advance before being assembled, an advantage is obtained that the strength is further improved by the subsequent carburizing or carbonitriding while a disadvantage of an increase of the manufacturing steps is accompanied. At any rate, as compared with conventionally employed processes in which two cages 3 and 4 and needle rollers 2 are separately heat-treated and the caulked portions are annealed, the manufacturing process is simplified.

If the soft-nitriding of cages 3 and 4 is done, the process shown in FIG. 6 may be used. Namely, cages 3 and 4 and needle rollers 2 are separately heat-treated (e.g. carburized, quenched and tempered or carbonitrided and then quenched and tempered) (step S1b), cages 3 and 4 and needle rollers 2 are set (step S2b) and thereafter cages 3 and 4 are caulked (step S3b).

Thrust needle roller bearing 1 which is manufactured through the above-describe procedure can offer specific characteristics that are described in detail below.

With regard to needle rollers 2, the surface layer thereof is a carburized or carbonitrided layer and thus the hardness of the surface layer is higher than that of conventional ones. Therefore, even if high-hardness foreign matters are caught in rollers, indentations are hardly made, which contributes to extension of the lifetime. In the carbonitriding process, a nitrogen-rich layer is formed and such a large amount of retained austenite as 20% by volume can be obtained. This feature contributes to an increase of the hardness as well as an extension of the lifetime since the large amount of retained austenite plastically deforms to alleviate stress concentration, which occurs in conventional bearings when a high-hardness foreign matter is caught between raceway surfaces 9a and 10a that leaves an indentation resulting in a source of stress concentration around the indentation. Here, the nitrogen-rich layer may specifically be at least 0.1 mm in thickness and at least 750 Hv in surface hardness. Moreover, the internal hardness can be increased to be almost equal to the surface hardness so that the strength of the entire needle rollers can be improved. Accordingly, when used under harsh conditions, for example, heavy load, the product of the present invention can sufficiently endure the load and satisfy a desired lifetime.

With regard to cages 3 and 4, as needle rollers 2, the surface layer of the cages is a carburized layer or carbonitrided layer, and a surface hardness of at least 400 Hv, or at least 600 Hv can be achieved depending on conditions of heat-treatment. The wear resistance can thus be enhanced as compared with conventional products.

Seventh Embodiment

This embodiment has its structure different from that of the sixth embodiment only in the shape of cages and caulking method. It is noted that the same or similar components or parts to those of the sixth embodiment are denoted by like reference characters and description thereof is not repeated here.

Referring to FIGS. 7A–7E, thrust needle roller bearing 11 applied to a support structure for the continuously variable transmission has a plurality of needle rollers 2 and two annular cages 13 and 14 that hold these needle rollers 2 at predetermined pitches in the circumferential direction. As shown in FIG. 7D, the upper one of two cages 13 and 14, namely upper cage 13, includes a roller holder portion 15a having its radially outer portion which includes a sloping extension 13a formed by bending the outer end of roller holder portion 15a and an outer plate-like portion 13b formed by bending the lower end of sloping extension 13a in the radial direction.

Roller holder portion 15a of upper cage 13 also has its radially inner portion which includes a sloping extension 13c formed by bending the inner end of roller holder portion 15a and an inner plate-like portion 13d formed by bending the lower end of sloping extension 13c in the radial direction.

Lower cage 14 with pockets punched with the same die as that for upper cage 13 has roller holder portion 16a with its radially outer portion including a sloping extension 14a formed by bending the outer end of roller holder portion 16a and an outer plate-like portion 14b formed by bending the outer end of sloping extension 14a in the radial direction. Roller holder portion 16a of lower cage 14 has its radially inner portion including a sloping extension 14c formed by bending the inner end of roller holder portion 16a and an inner plate-like portion 14d formed by bending the inner end of sloping extension 4c in the radial direction.

As shown in FIG. 7D, respective outer plate-like portions 13b and 14b of two cages 13 and 14 are laid on each other so that these plates are in contact with each other in the direction perpendicular to the radial direction (herein perpendicular direction). The outermost part of outer plate-like portion 14b is partially bent upward into C-shape so that outer plate-like portion 14b is caulked partially to outer plate-like portion 13b to form partially caulked portions 17. Inner plate-like portions 13d and 14d are also laid on each other so that these plates are in contact with each other in the perpendicular direction, and the innermost part of inner plate-like portion 13d is bent downward.

Further, as shown in FIG. 7E, outer plate-like portions 13b and 14b are laid on each other so that they are in contact with each other in the perpendicular direction and the outermost part of outer plate-like portion 14b is bent upward. Inner plate-like portions 13d and 14d are laid on each other so that they are in contact with each other in the perpendicular direction and the innermost part of inner plate-like portion 13d is partially bent downward into C-shape so that inner plate-like portion 13d is partially caulked to inner plate-like portion 14d to form partially caulked portions 18. With these partially caulked portions 17 and 18, the inner and outer edges of two cages 13 and 14 are firmly integrated and, in this case, the manufacturing process can remarkably be simplified as compared with the caulking of the entire periphery of the thrust needle roller bearing (FIGS. 2A–2E) of the sixth embodiment described above.

An alignment part 19 for alignment between two cages 13 and 14 includes, for example, a notch (not shown) made in the outer rim of upper cage 13 and a projection (not shown) formed on the outer rim of lower cage 14, and the projection and the notch are engaged with each other so as to prevent displacement of pitches of pockets 15 and 16 of cages 13 and 14 in the caulking process for example. Those partially caulked portions 17 and 18 are arranged at four positions on the periphery with a phase difference of 45° between the caulked portions. In this way, deformation of the cages in the caulking process is reduced. Here, the number of positions where the caulked portions are placed is not limited to four. In terms of the strength, the caulked portions may be arranged at two or more positions (e.g. five to eight positions) at regular intervals. Then, deformation of the cages in the caulking process can be reduced.

Eighth Embodiment

This embodiment differs in structure from the seventh embodiment only in the direction of the caulking. It is noted that the same or similar components or parts to those of the seventh embodiment are denoted by like reference characters and detailed description thereof is not repeated here.

Referring to FIGS. 8A–8D, thrust needle roller bearing 11' applied to a support structure for the continuously variable transmission has a plurality of needle rollers 2 and two annular cages 13' and 14' that hold these needle rollers 2 at predetermined pitches in the circumferential direction. Of two cages 13' and 14', upper cage 13' includes a roller holder portion 15a which has its radially outer portion including, as shown in FIG. 8C, a sloping extension 13a formed by bending the outer end of roller holder portion 15a and an outer plate-like portion 13b formed by bending the lower end of sloping extension 13a in the radial direction. Roller holder portion 15a of upper cage 13 also has its radially inner portion including a sloping extension 13c formed by bending the inner end of roller holder portion 15a and an inner plate-like portion 13d' formed by bending the lower end of sloping extension 13c in the radial direction.

Lower cage 14 includes a roller holder portion 16a having its radially outer portion including a sloping extension 14a formed by bending the outer end of roller holder portion 16a and an outer plate-like portion 14b formed by bending the outer end of sloping extension 14a in the radial direction. Roller holder portion 16a of lower cage 14 also has its radially inner portion including a sloping extension 14c formed by bending the inner end of roller holder portion 16a and an inner plate-like portion 14d' formed by bending the inner end of sloping extension 14c in the radial direction.

As shown in FIG. 8C, outer plate-like portions 13b and 14b of two cages 13' and 14' are laid on each other so that they are in contact with each other in the perpendicular direction, and the outermost part of outer plate-like portion 14b is partially bent upward into C-shape to partially caulk outer plate-like portion 14b to outer plate-like portion 13b and thereby form partially caulked portions 17. On the other hand, inner plate-like portions 13d' and 14d' are laid on each other so that they are in contact with each other in the perpendicular direction and the innermost part of inner plate-like portion 14d' is bent upward.

Further, as shown in FIG. 8D, inner plate-like portions 13d' and 14d' are laid on each other so that they are in contact with each other in the perpendicular direction and the innermost part of inner plate-like portion 14d' is partially bent upward into C-shape to partially caulk inner plate-like portion 14d' to inner plate-like portion 13d' and thereby form partially caulked portions 18'. On the other hand, outer plate-like portions 13b and 14b are laid on each other so that they are in contact with each other in the perpendicular direction and the outermost part of outer plate-like portion 14b is bent upward.

These partially caulked portions 17 and 18' allow two cages 13' and 14' to firmly be integrated on the inner and outer ends. In addition, the presence of partially caulked portions 17 and 18' on the same plane can further facilitate the caulking process, as compared with the partial caulking of the above-described second embodiment.

Ninth Embodiment

This embodiment differs in structure from the above-discussed sixth to eighth embodiments only in the means for fixing the two cages. It is noted that the same or similar components or parts to those of the sixth to eighth embodiments are denoted by like reference characters and description thereof is not repeated here.

Referring to FIGS. 9A–9C, thrust needle roller bearing 21 applied to a support structure which carries a thrust load of the transmission has a plurality of needle rollers 2 and two annular cages 23 and 24 that hold these needle rollers 2 at predetermined pitches in the circumferential direction. Of two cages 23 and 24, upper cage 23 has a roller holder portion 25a with its radially outer portion including a sloping extension 23a formed by bending the outer end of roller holder portion 25a and an outer plate-like portion 23b formed by bending the lower end of sloping extension 23a in the radial direction, as shown in FIG. 9C. The radially inner portion of roller holder portion 25a of upper cage 23 has a sloping extension 23c formed by bending the inner end of roller holder portion 25a and an inner plate-like portion 23d formed by bending the lower end of sloping extension 23c in the radial direction.

Lower cage 24 has its roller holder portion 26a having a radially outer portion including a sloping extension 24a formed by bending the outer end of roller holder portion 26a and an outer plate-like portion 24b formed by bending the outer end of sloping extension 24a in the radial direction. Roller holder portion 26a of lower cage 24 also has its radially inner portion including a sloping extension 24c formed by bending the inner end of roller holder portion 26a and an inner plate-like portion 24d formed by bending the inner end of sloping extension 24c in the radial direction.

As shown in FIG. 9C, outer plate-like portions 23b and 24b of two cages 23 and 24 are laid on each other so that they are in contact with each other in the perpendicular direction and the outermost part of outer plate-like portion 24b is bent upward. On the other hand, inner plate-like portions 23d and 24d are laid on each other so that they are in contact with each other in the perpendicular direction and the innermost part of inner plate-like portion 24d is bent upward. The innermost part of inner plate-like portion 23d may be bent downward. According to this embodiment, the inner periphery and the outer periphery of two cages 23 and 24 are integrally fixed at spot-welded portions 27 and 28 as shown in FIG. 9A. These welded portions 27 and 28 are arranged at four positions at regular intervals in the circumferential direction with a phase difference of 45° between the welded portions. Any deformation of the cages due to the welding is thus reduced. Here, the number of positions where the welding is done is not limited to four. In terms of the strength, at least two (e.g. five to eight) spot-welded positions at regular intervals can reduce the deformation of the cages due to the welding.

An alignment part 29 for alignment between two cages 23 and 24 includes a projection 29a formed on the outer rim of upper cage 23 and a notch 29b formed in the outer rim of lower cage 24, and these projection 29a and notch 29b are engaged with each other in order to prevent displacement of phases of pockets 25 and 26 of two cages 23 and 24. The structure of this alignment part 29 is not limited to the above-described one. For example, so-called staking method may be applied according to which the outer rim of lower cage 24 is partially caulked to be engaged with upper cage 2.

Figure 16A:
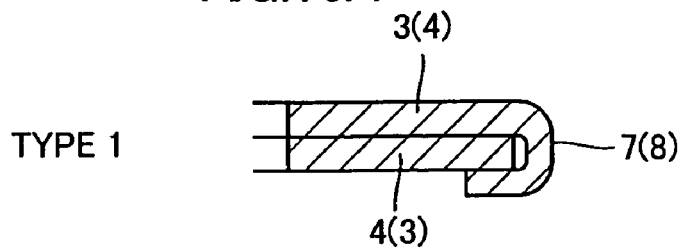
FIGS. 16A–16E are each a cross-sectional view showing a shape of a part which is bent for caulking on the outermost end or the innermost end of cages.
Figure 16B:
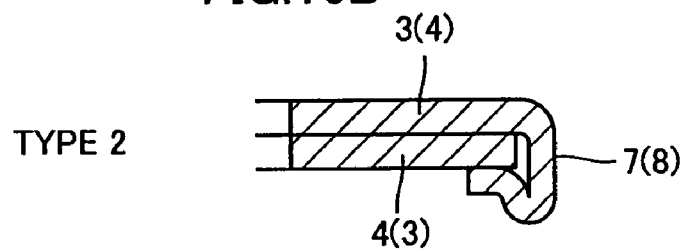
Figure 16C:
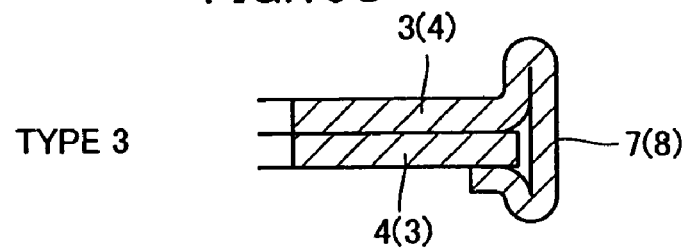
Figure 16D:
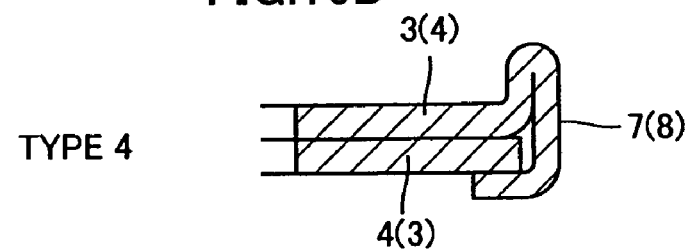
Figure 16E:
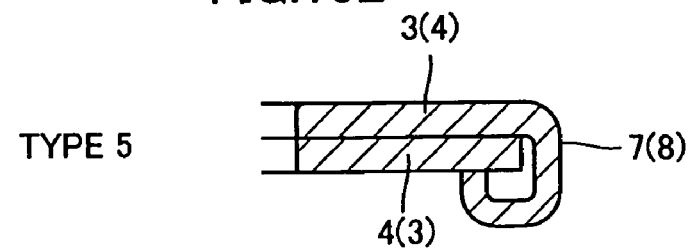
Figure 17A:
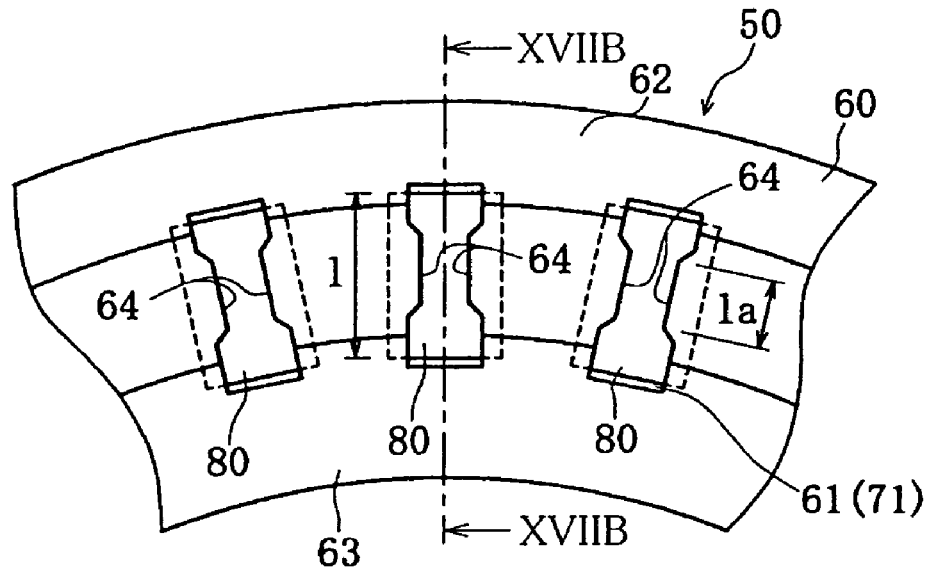
FIG. 17A is a partial plan view showing a conventional thrust needle roller bearing.
Figure 17B:
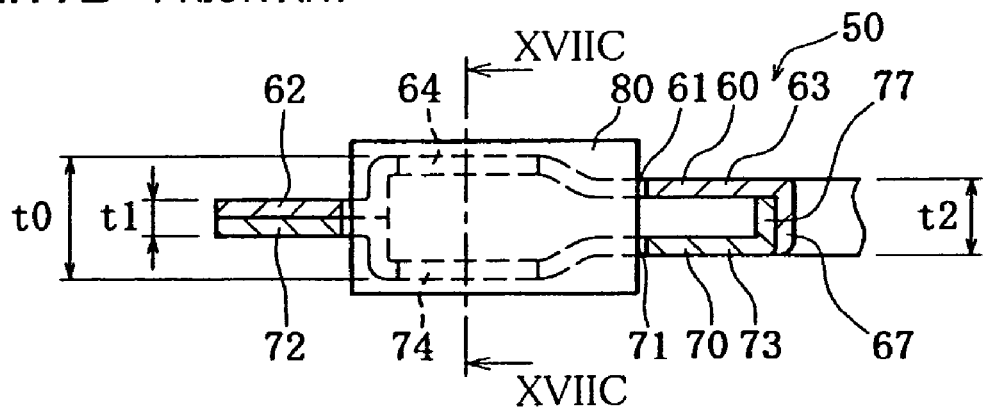
FIG. 17B is a cross-sectional view along line XVIIB—XVIIB in FIG. 17A
Figure 17C:
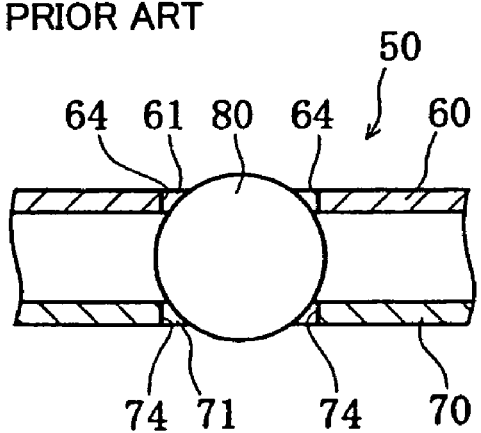
FIG. 17C is a cross-sectional view along line XVIIC—XVIIC in FIG. 17B.

According to the description above, although the outermost part or the innermost part of cage 3 or 4 is partially or entirely bent along the periphery into C-shape to be caulked as shown in FIG. 16A, the shape of the bent and caulked portion is not limited to this and may be any of respective shapes shown in FIGS. 16B–16E.

Further, although the thrust needle roller bearing of the sixth embodiment is applied to the CVT, any of the thrust needle roller bearings of the seventh to ninth embodiments may be applied to the CVT.

According to the sixth to ninth embodiments described above, preferably needle rollers 2a and 2b have an end shape represented by symbol "A" (round) defined by JIS (Japanese Industrial Standards) as shown in FIG. 12A, an end shape represented by symbol "F" (flat) defined by JIS as shown in FIG. 12B, or an end shape of a combination of those represented respectively by symbols "A" and "F" defined by JIS.

Moreover, although the structures of the above-described embodiments carry the thrust loads of the input shafts (shaft 301a, primary shaft 301), the thrust needle roller bearing having needle rollers arranged in two rows may be applied to a support structure carrying the thrust load of the output shaft (secondary shaft 303).

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A support structure carrying a thrust load of a transmission having an input shaft with its rotation changed stepwise or continuously to be transmitted to an output shaft, wherein a thrust needle roller bearing carries a thrust load generated by rotation of said input shaft or said output shaft and said thrust needle roller bearing has needle rollers arranged in two rows, said thrust needle roller bearing has a plurality of needle rollers and two annular cages, said two annular cages respectively have a plurality of pockets having a radial length slightly larger than that of said needle rollers, roller holder portions formed at said plurality of pockets respectively are structured to allow said two cages to hold said needle rollers therebetween in the direction from above and below, and said needle rollers are arranged in two rows in each of said plurality of pockets, said two cages are caulked on both of the radially outermost end and the radially innermost end of said two cages, and a flat portion having a cross-sectional height lower than that of said roller holders is provided between a caulked portion produced by caulking of said two cages and corresponding ends of said needle rollers, the radial length of the roller holder portions is smaller than the total radial length of the needle rollers in the two rows, and the pockets where the needle rollers are placed each have an end located at the flat portion of the cages.

2. The support structure according to claim 1, wherein said transmission includes a torque converter having an impeller and a turbine opposite to each other with a stator therebetween, and said thrust needle roller bearing having said needle rollers arranged in two rows is provided at, at least one of places respectively between said stator and said impeller and between said stator and said turbine.

3. The support structure according to claim 1, wherein
said transmission includes a gear mechanism constituted of a plurality of gears, and
said thrust needle roller bearing having said needle rollers arranged in two rows is provided to carry a thrust load generated by rotation of said gears.

4. The support structure according to claim 1, wherein
said support structure carrying a thrust load of said transmission is a support structure for a continuously variable transmission having an input shaft with its rotation changed continuously to be transmitted to an output shaft.

5. The support structure according to claim 4, wherein
the width of a groove of a first pulley provided on said input shaft and the width of a groove of a second pulley provided on said output shaft are each changed to vary the diameter of contact of a belt, looped over said first pulley and said second pulley, with said first pulley as well as the diameter of contact of said belt with said second pulley and thereby continuously change rotation of said input shaft to transmit resultant rotation to said output shaft.

6. The support structure according to claim 1, wherein
said needle rollers have an end-surface shape represented by symbol A, symbol F or a combination of those represented by symbols A and F defined by JIS.

7. The support structure according to claim 1, wherein
one of said needle rollers arranged in two rows that is located on the radially outer side has its length which is at least the length of the needle roller located on the radially inner side.

8. The support structure according to claim 1, wherein
said roller holder portions have their corners rounded smoothly.

9. A thrust needle roller bearing used for a support structure carrying a thrust load of a transmission having an input shaft with its rotation changed stepwise or continuously to be transmitted to an output shaft, wherein
the thrust needle roller bearing carries a thrust load generated by rotation of said input shaft or said output shaft, and said thrust needle roller bearing has needle rollers arranged in two rows,
said thrust needle roller bearing has a plurality of needle rollers and two annular cages, said two annular cages respectively have a plurality of pockets having a radial length slightly larger than that of said needle rollers, roller holder portions formed at said plurality of pockets respectively are structured to allow said two cages to hold said needle rollers therebetween in the direction from above and below, and said needle rollers are arranged in two rows in each of said plurality of pockets,
said two cages are caulked on both of the radially outermost end and the radially innermost end of said two cages, and a flat portion having a cross-sectional height lower than that of said roller holders is provided between a caulked portion produced by caulking of said two cages and corresponding ends of said needle rollers,
the radial length of the roller holder portions is smaller than the total radial length of the needle rollers in the two rows, and
the pockets where the needle rollers are placed each have an end located at the flat portion of the cages.

* * * * *